US012675021B2

(12) United States Patent
Sarvi et al.

(10) Patent No.: US 12,675,021 B2
(45) Date of Patent: Jul. 7, 2026

(54) SEALING LAYERS COMPRISING A CONDUCTIVE FILLER FOR SEALING MICROCELLS OF ELECTROPHORETIC DISPLAYS

(71) Applicant: E Ink Corporation, Billerica, MA (US)

(72) Inventors: Ali Sarvi, San Jose, CA (US); Abraham Berhane, Tracy, CA (US); Mary E. Parent, Mountain View, CA (US); Kenneth R. Crounse, Somerville, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 67 days.

(21) Appl. No.: 18/990,127

(22) Filed: Dec. 20, 2024

(65) Prior Publication Data

US 2025/0123532 A1     Apr. 17, 2025

Related U.S. Application Data

(62) Division of application No. 17/590,835, filed on Feb. 2, 2022, now Pat. No. 12,276,894.

(60) Provisional application No. 63/145,582, filed on Feb. 4, 2021.

(51) Int. Cl.
| | |
|---|---|
| *G02F 1/1679* | (2019.01) |
| *C08K 3/04* | (2006.01) |
| *C08L 29/04* | (2006.01) |
| *C09D 129/04* | (2006.01) |
| *G02F 1/167* | (2019.01) |

(52) U.S. Cl.
CPC .............. *G02F 1/1679* (2019.01); *C08K 3/04* (2013.01); *C08L 29/04* (2013.01); *C09D 129/04* (2013.01); *G02F 1/167* (2013.01); *C08K 2201/001* (2013.01); *C08K 2201/005* (2013.01); *C08K 2201/006* (2013.01); *C08L 2203/16* (2013.01)

(58) Field of Classification Search
CPC .................. G02F 1/1679; G02F 1/167; G02F 2001/1678; C08K 3/04; C08K 2201/001; C08K 2201/005; C08K 2201/006; C08K 5/29; C08K 2201/011; C08L 29/04; C08L 2203/16; C08L 2205/03; C08L 75/04; C09D 129/04; C09D 5/00; C09D 7/61; Y02A 50/30
See application file for complete search history.

(56) References Cited

U.S. PATENT DOCUMENTS

| | | | |
|---|---|---|---|
| 6,241,921 | B1 | 6/2001 | Jacobson et al. |
| 6,306,375 | B1 | 10/2001 | Ellingson et al. |
| 6,922,276 | B2 | 7/2005 | Zhang et al. |
| 6,933,098 | B2 | 8/2005 | Chan-Park et al. |
| 6,982,178 | B2 | 1/2006 | LeCain et al. |
| 7,002,728 | B2 | 2/2006 | Pullen et al. |
| 7,005,468 | B2 | 2/2006 | Zang et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,170,670 | B2 | 1/2007 | Webber |
| 7,245,417 | B2 | 7/2007 | Takeda |
| 7,312,784 | B2 | 12/2007 | Baucom et al. |
| 7,347,957 | B2 | 3/2008 | Wu et al. |
| 7,411,719 | B2 | 8/2008 | Paolini, Jr. et al. |
| 7,453,445 | B2 | 11/2008 | Amundson |
| 7,463,409 | B2 | 12/2008 | Daniel et al. |
| 7,535,624 | B2 | 5/2009 | Amundson et al. |
| 7,561,324 | B2 | 7/2009 | Duthaler et al. |
| 7,615,325 | B2 | 11/2009 | Liang et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 8,009,348 | B2 | 8/2011 | Zehner et al. |
| 8,830,561 | B2 | 9/2014 | Zang et al. |
| 9,279,906 | B2 | 3/2016 | Kang |
| 9,759,978 | B2 | 9/2017 | Liu |
| 9,921,452 | B2 | 3/2018 | Nakamura et al. |
| 10,087,344 | B2 | 10/2018 | Moran |
| 10,444,553 | B2 | 10/2019 | Laxton |

(Continued)

FOREIGN PATENT DOCUMENTS

| | | |
|---|---|---|
| CN | 106987227 A | 7/2017 |
| JP | 2004138959 A | 5/2004 |

(Continued)

OTHER PUBLICATIONS

Fruzsina, "Surface Energy Heterogeneity Profiles of Carbon Nanotubes With a Copolymer-modified Surface Using Surface Energy Mapping by Inverse Gas Chromatography," 2017, Hungarian Journal of Industry and Chemistry, 45, 1, pp. 61-66. (Year: 2017).*
Dresel, "Influence of the Wetting Behavior and Surface Energy on the Dispersibility of Multi-Wall Carbon Nanotubes," 2016, Colloids and Surfaces A: Physiochemical and Engineering Aspects, 489, pp. 57-66. (Year: 2016).*
Dresel, A. et al., "Influence of the Wetting Behavior and Surface Energy on the Dispersibility of Multi-Wall Carbon Nanotubes", Colloids and Surfaces A Physicochemical and Engineering Aspects, vol. 489, pp. 57-66 (2016).
Gerencsér, Fruzsina et al., "Surface Energy Heterogeneity Profiles of Carbon Nanotubes with a Copolymer-Modified Surface using Surface Energy Mapping by Inverse Gas Chromatography", Hungarian Journal of Industry and Chemistry, vol. 45, No. 1, pp. 61-66 (2017).

(Continued)

*Primary Examiner* — Robert S Jones, Jr.
*Assistant Examiner* — Joshua Caleb Bledsoe
(74) *Attorney, Agent, or Firm* — Ioannis Constantinides

(57) ABSTRACT

The present invention is directed to a sealing layer that comprises a poly(vinyl alcohol) homopolymer or a poly(vinyl alcohol-co-ethylene) copolymer, a polyurethane, and a conductive filler. The sealing layer shows good barrier properties to a non-polar fluid. The sealing layer can be used to seal microcells of electro-optic devices, contributing to improved good electro-optic performance of the device, especially at low temperatures.

18 Claims, 14 Drawing Sheets

(56)           References Cited

U.S. PATENT DOCUMENTS

| | | | |
|---|---|---|---|
| 10,510,965 B2 * | 12/2019 | Matsushita | .......... H10K 10/462 |
| 10,613,407 B2 | 4/2020 | Lin et al. | |
| 11,485,179 B2 | 11/2022 | Agarwal et al. | |
| 2004/0120024 A1 | 6/2004 | Chen et al. | |
| 2004/0219306 A1 | 11/2004 | Wang et al. | |
| 2006/0132579 A1 * | 6/2006 | Daniel | .................. G02F 1/1675 |
| | | | 347/171 |
| 2008/0020007 A1 | 1/2008 | Zang | |
| 2015/0005720 A1 | 1/2015 | Zang | |
| 2016/0012710 A1 | 1/2016 | Lu et al. | |
| 2017/0205649 A1 * | 7/2017 | Wang | ...................... G02F 1/167 |
| 2020/0326604 A1 | 10/2020 | Yoon et al. | |
| 2022/0244612 A1 | 8/2022 | Sarvi et al. | |

FOREIGN PATENT DOCUMENTS

| | | |
|---|---|---|
| JP | 2018205479 A | 12/2018 |
| KR | 20150064828 A | 6/2015 |

OTHER PUBLICATIONS

Thomas. G. Harvey., "Replication techniques for micro-optics"., Proc. vol. 3099, pp. 76-82 (1997) Sep. 24, 1997.
Korean Intellectual Property Office, "International Search Report and Written Opinion", PCT/US2022/015007, May 26, 2022. May 26, 2022.
European Patent Office, "Extended European Search Report", EP Appl. No. 22750361.2, Nov. 22, 2024. Nov. 22, 2024.

* cited by examiner

UV OR LIGHT

UV OR LIGHT

610

616

614

615

611b

612

613

UV OR LIGHT

610

617

611b

612

613

700

702

701

710

770

725

702

701

710

780

725

730

702

701

710

790

725

750

730

702

701

710

800

803
804
805

806
807

850

851
852
853
854
855
856
857
858
859
860

861

White state at 25°C

White state at 0°C

SEALING LAYERS COMPRISING A CONDUCTIVE FILLER FOR SEALING MICROCELLS OF ELECTROPHORETIC DISPLAYS

RELATED APPLICATION

This application is a divisional application of co-pending U.S. patent application Ser. No. 17/590,835 filed on Feb. 2, 2022 (Publication No. US2022-0244612-A1), which claims priority to U.S. Provisional Patent Application No. 63/145,582, filed on Feb. 4, 2021, which is incorporated by reference in its entirety, along with all other patents and patent applications disclosed herein.

FIELD OF THE INVENTION

This invention relates to aqueous polymer compositions and sealing layers comprising a conductive filler. The aqueous polymer compositions can be used to form sealing layers for sealing microcells of electro-optic devices, such as electrophoretic displays.

BACKGROUND OF THE INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic devices. This type of display is properly called "multi-stable" rather than bistable, although for convenience the term "bistable" may be used herein to cover both bistable and multi-stable displays.

One type of electro-optic device, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film.

The technologies described in these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; 7,005,468; and 7,715,088; and U.S. Patent Application Publications Nos. 2004-0120024; and 2004-0219306;

(e) Films and sub-assemblies containing electro-optic materials; see for example U.S. Pat. Nos. 6,982,178; and 7,839,564;

(f) Backplanes, adhesive layers and other auxiliary layers and methods used in displays; see for example U.S. Pat. Nos. 7,116,318; and 7,535,624;

(g) Color formation and color adjustment; see for example U.S. Pat. Nos. 7,075,502; and 7,839,564;

(h) Methods for driving displays; see for example U.S. Pat. Nos. 7,012,600; and 7,453,445;

(i) Applications of displays; see for example U.S. Pat. Nos. 7,312,784; and 8,009,348; and (j) Non-electrophoretic displays, as described in U.S. Pat. No. 6,241,921; and U.S. Patent Applications Publication No. 2015/0277160; and applications of encapsulation and microcell technology other than displays; see for example U.S. Pat. No. 7,615,325; and U.S. Patent Application Publications Nos. 2015/0005720 and 2016/0012710.

The contents of all of the above references are incorporated herein by reference in their entirety.

Structures having a plurality of sealed microcells containing a dispersion of charged pigment particles in a non-polar fluid are used commercially in electrophoretic displays. The microcells are also known in the literature as microcavities or microcups. A typical process of making sealed microcell structures for electrophoretic displays involves (a) fabricating, via microembossing, a polymeric sheet having a plurality of microcavities, wherein each microcavity has an opening, (b) filling the microcavities with an electrophoretic medium, which is a dispersion comprising charged pigment particles in a non-polar fluid, and (c) sealing the microcavities with an aqueous polymer composition, forming a sealing layer. The sealed microcavities, which contain electrophoretic medium, form the electro-optic material layer of the device. The electro-optic material layer is disposed between a front and a rear electrode. Application of an electric field across the electrophoretic medium via these electrodes causes pigment particles to migrate through the electrophoretic medium creating an image. The sealing layer plays an important role for the function and performance of the device.

Firstly, as the sealing layer is in contact with the electrophoretic medium and seals it inside the microcavities, (1) it must be practically insoluble in the non-polar fluid of the electrophoretic medium and (2) it must be a good barrier to the non-polar fluid, so that the non-polar fluid does not diffuse out form the microcells during the life of the device.

Secondly, the sealing layer must not absorb significant amount of moisture from the environment. That is, it must prevent environmental moisture from entering into the electrophoretic medium of the device; such moisture would negatively affect the electro-optic performance of the device.

Finally, it is very important that the sealing layer of an electrophoretic display has good electrical properties. The electric field, which is applied across the electrophoretic medium for the operation of the display, is transmitted through the sealing layer.

Thus, barrier, moisture absorption, and electrical properties of the sealing layer have significant influence on the electro-optic performance of the display. Inferior properties lead to the deterioration of the performance. The technical problem of providing a sealing layer with properties that lead to a good electro-optic performance is challenging, because the different objectives may require different formulation strategies. For examples, barrier property for non-polar fluids typically require more hydrophilic components, whereas such components absorb more moisture from the environment. Furthermore, sealing layers having high electrical resistivity require higher power consumption for the operation of the display, whereas sealing layers having low resistivity lead to inferior image resolution. Thus, there is a need for polymer compositions that form optimized sealing layers for improved barrier towards non-polar fluids, reduced moisture absorption, and optimal electrical resistivity. The inventors of the present invention found that aqueous polymer compositions comprising poly(vinyl alcohol) homopolymer or poly(vinyl alcohol-co-ethylene) copolymer, polyurethane, and a conductive filler, forming sealing layers with surface energy in a specific range, lead to excellent electro-optic performance.

SUMMARY OF THE INVENTION

In one aspect, the present invention is directed to a sealing layer comprising: (i) from 30 to 70 weight % of a water soluble poly(vinyl alcohol) homopolymer or poly(vinyl alcohol-co-ethylene) copolymer by weight of the sealing layer excluding solvents, the poly(vinyl alcohol) having a degree of hydrolysis of from 90 to 99.9%, and the poly(vinyl alcohol-co-ethylene) copolymer having a degree of hydrolysis of from 90 to 99.9% and ethylene content of less than 10%; (ii) from 7 to 29 weight % of a polyurethane by weight of the sealing layer excluding solvents; (iii) from 1 to 45 weight % of a conductive filler by weight of the sealing layer excluding solvents, the conductive filler being selected from the group consisting of carbon black, graphene, graphite, and carbon nanotubes, the conductive filler having a total surface energy, said total surface energy of the said total surface energy being higher than 40 mN/m, determined by the Washburn method, using hexane as test liquid. The conductive filler has a dispersive component of the surface energy. The dispersive component of the surface energy of the conductive filler may be higher than 15 mN/m, determined by the Washburn method using hexane as test liquid.

The sealing layer has a total surface energy, the total surface energy of the sealing layer being higher than 55 mN/m. The total surface energy of the sealing layer is determined using the Contact Angle Method by (a) forming the sealing layer by coating an aqueous polymer composition on a substrate at a dry thickness of 30 mm, heating at 100° C. for 15 minutes, and conditioning the sealing layer at 25° C. and 55% relative humidity for 24 hours, (b) measuring the contact angles of a water droplet and a diiodomethane droplet on the formed sealing layer, and (c) calculating the total surface energy using the OWRK model.

The sealing layer may have a dispersive component of the surface energy, said dispersive component of the surface energy may be higher than 40 mN/m. The dispersive component of the surface energy of the sealing layer is determined using the Contact Angle Method by (a) forming the sealing layer by coating an aqueous polymer composition on a substrate at a dry thickness of 30 mm, heating at 100° C. for 15 minutes, and conditioning the sealing layer at 25° C. and 55% relative humidity for 24 hours, (b) measuring the contact angles of a water droplet and a diiodomethane droplet on the formed sealing layer, and (c) calculating the dispersive component of the surface energy using the OWRK model.

The sealing layer is formed by an aqueous polymer composition. The aqueous polymer composition comprises: (i) from 30 to 70 weight % of a water soluble poly(vinyl alcohol) homopolymer or poly(vinyl alcohol-co-ethylene) copolymer by weight of the sealing layer excluding solvents, the poly(vinyl alcohol) having a degree of hydrolysis of from 90 to 99.9%, and the poly(vinyl alcohol-co-ethylene) copolymer having a degree of hydrolysis of from 90 to 99.9% and ethylene content of less than 10%; (ii) from 7 to 29 weight % of a polyurethane by weight of the sealing layer excluding solvents; (iii) from 1 to 45 weight % of a conductive filler by weight of the sealing layer excluding solvents, the conductive filler being selected from the group consisting of carbon black, graphene, graphite, and carbon nanotubes, the conductive filler having a total surface energy, said total surface energy being higher than 40 mN/m, determined by the Washburn method, using hexane as test liquid. The conductive filler has a dispersive component of the surface energy. The dispersive component of the surface energy of the conductive filler may be higher than 15 mN/m, determined by the Washburn method using hexane as test liquid. The sealing layer has a total surface energy, the total surface energy of the sealing layer being higher than 55 mN/m. The total surface energy of the sealing layer is determined using the Contact Angle Method by (a) forming the sealing layer by coating an aqueous polymer composition on a substrate at a dry thickness of 30 mm, heating at 100° C. for 15 minutes, and conditioning the sealing layer at 25° C. and 55% relative humidity for 24 hours, (b) measuring the contact angles of a water droplet and a diiodomethane droplet on the formed sealing layer, and (c) calculating the total surface energy using the OWRK model. The sealing layer has a dispersive component of the surface energy, said dispersive component of the surface energy may be higher than 40 mN/m. The dispersive component of the surface energy of the sealing layer is determined on the sealing layer using the Contact Angle Method.

The polyurethane of the sealing layer may be crosslinked by a crosslinker. The crosslinker may be a polyisocyanate, a multifunctional polycarbodiimide, a multifunctional aziridine, a silane coupling agent, a boron/titanium/zirconium-based crosslinker, or a melamine formaldehyde. The polyurethane of the sealing layer may have number average molecular weight from 1,000 to 2,000,000 Daltons.

The polyurethane of the sealing layer has a polar component of the surface energy. The polar component of the surface energy of the polyurethane may be between 10 mN/m and 20 mN/m. The polar component of the surface energy of the polyurethane is determined on a polyurethane film using the Contact Angle Method. The Contact Angle Method comprises the steps (a) forming a polyurethane film by coating an aqueous polyurethane composition on a substrate at a dry thickness of 30 mm, heating at 100° C. for 15 minutes, and conditioning the polyurethane film at 25° C. and 55% relative humidity for 24 hours, (b) measuring the contact angles of a water droplet and a diiodomethane droplet on the formed polyurethane film, and (c) calculating the polar component of the surface energy of the polyurethane using the OWRK model.

The sealing layer may comprise a wetting agent. The wetting agent may be an organosilicone surface tension reducing agent.

The conductive filler of the sealing layer may be carbon black. The carbon black may have oil absorption number less than 100 mL per 100 mg of carbon black measured by the oil absorption number method according to ASTM 2414. The carbon black may have average particle size larger than 20 nm measured by electron microscopy method according to ASTM D3849. The carbon black may have specific surface area less than 90 m²/g measured by the nitrogen adsorption method according to ASTM D6556. The carbon black may have specific surface area less than 200 m²/g, measured by the nitrogen adsorption method according to ASTM D6556, and volatile content higher than 5% measured by the method according to DIN 53552.

The poly(vinyl alcohol) homopolymer or poly(vinyl alcohol-co-ethylene) copolymer of the sealing layer may have number average molecular weight from 1,000 to 1,000,000 Daltons. The poly(vinyl alcohol) homopolymer or poly(vinyl alcohol-co-ethylene) copolymer of the sealing layer may have a degree of hydrolysis of form 92% to 99%. The poly(vinyl alcohol-co-ethylene) copolymer of the sealing layer may have ethylene content of less than 9%.

The sealing layer may be used for sealing microcells of an electrophoretic display. The electrophoretic display may comprise: a first light-transmissive electrode layer; an electro-optic material layer comprising a plurality of microcells and the sealing layer, wherein each of the plurality of microcells includes a bottom, walls, and an opening, and contains an electrophoretic medium, wherein said electrophoretic medium comprises at least one type of charged pigment particles dispersed in a non-polar fluid, and wherein the sealing layer spans the openings of the plurality of microcells; a second electrode layer; wherein the electro-optic material layer is disposed between the first light-transmissive electrode layer and the second electrode layer. The sealing layer may be formed from the aqueous polymer composition.

In another aspect, the inventions provides a sealing layer comprising: (i) from 30 to 70 weight % of a water soluble poly(vinyl alcohol) homopolymer or poly(vinyl alcohol-co-ethylene) copolymer by weight of the sealing layer excluding solvents, the poly(vinyl alcohol) having a degree of hydrolysis of from 90 to 99.9%, and the poly(vinyl alcohol-co-ethylene) copolymer having a degree of hydrolysis of from 90 to 99.9% and ethylene content of less than 10%; (ii) from 7 to 29 weight % of a polyurethane by weight of the sealing layer excluding solvents, the polyurethane having a total surface energy, said total surface energy being higher than 50 mN/m, said total surface energy of the polyurethane being determined on a polyurethane film using the Contact Angle Method; (iii) from 1 to 45 weight % of a conductive filler by weight of the sealing layer excluding solvents, the conductive filler being selected from the group consisting of carbon black, graphene, graphite, and carbon nanotubes, the conductive filler having a total surface energy, said total surface energy of the conductive filler being higher than 40 mN/m, said total surface energy being determined by the Washburn method using hexane as test liquid. The sealing layer has a total surface energy. The total surface energy of the sealing layer may be higher than 55 mN/m. The total surface energy of the sealing layer is determined using the Contact Angle Method. The Contact Angle Method comprising the steps: (a) forming a polyurethane film by coating an aqueous polyurethane composition on a substrate at a dry thickness of 30 mm, heating at 100° C. for 15 minutes, and conditioning the sealing layer at 25° C. and 55% relative humidity for 24 hours, (b) measuring the contact angles of a water droplet and a diiodomethane droplet on the formed polyurethane film, and (c) calculating the total surface energy of polyurethane using the OWRK model. The sealing layer may have a dispersive component of the surface energy, said dispersive component of the surface energy being higher than 40 mN/m. The dispersive component of the surface energy of the sealing layer is determined using the Contact Angle Method.

The sealing layer may also be used for sealing microcells of a front plane laminate. The front plane laminate may comprise a first light-transmissive electrode layer, an electro-optic material layer, an adhesive layer, and a release sheet. The electrophoretic display may comprise a first light-transmissive electrode layer, an electro-optic material layer, and a second electrode layer. The electro-optic material layer is disposed between the first light-transmissive electrode layer and the second electrode layer. The electro-optic material layer comprises a plurality of microcells and a sealing layer. The sealing layer may be formed by an aqueous polymer composition. Each of the plurality of microcell includes a bottom, walls, and an opening, and contains an electrophoretic medium, wherein said electrophoretic medium comprises at least one type of charged pigment particles dispersed in a non-polar fluid. The sealing layer spans the openings of the plurality of microcells.

The sealing layer may also be used for sealing microcells of a double release sheet. The double release sheet may comprise a first release sheet, a first adhesive layer, an electro-optic material layer, a second adhesive layer, and a second release sheet. The electro-optic material layer may comprise a plurality of microcells and a sealing layer. The sealing layer may be formed from an aqueous polymer composition. Each of the plurality of microcell includes a bottom, walls, and an opening, and contains an electrophoretic medium, wherein said electrophoretic medium comprises at least one type of charged pigment particles dispersed in a non-polar fluid. The sealing layer spans the openings of the plurality of microcells.

BRIEF DESCRIPTION OF THE DRAWINGS

In FIGS. 6C and 6D a combination of top and bottom exposure is used, allowing the walls in one lateral direction to be cured by top photomask exposure, and the walls in another lateral direction to be cured bottom exposure through the opaque base conductor film.

DETAILED DESCRIPTION OF THE INVENTION

The term "excluding solvents", referred to the weight of the sealing layer or the weight of the aqueous polymer composition of the present invention, means that the referred weight of the sealing layer or the referred weight of the aqueous polymer composition does not include water and other solvents that may be present in the sealing layer or the aqueous polymer composition.

The term "molecular weight" or "MW" as used herein refers to the number average molecular weight, unless otherwise stated. The number average molecular weight may be measured by gel permeation chromatography.

A. Structure of Microcells

Figure 1:
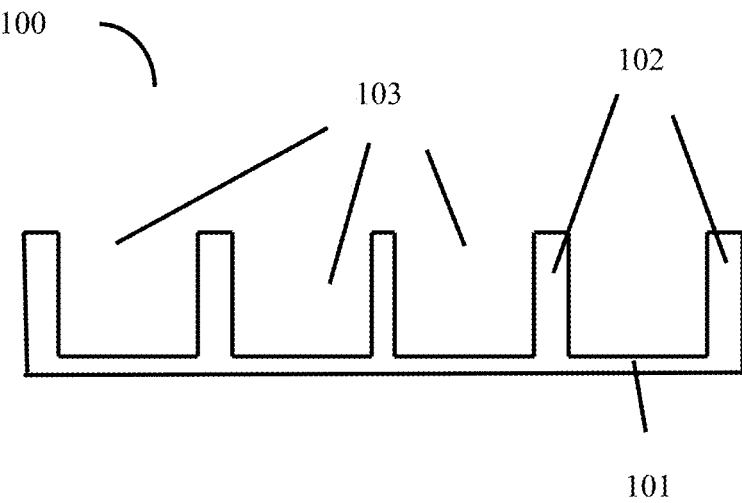
FIG. 1 illustrates a structure of a plurality of microcells before they are filled and sealed.

FIG. 1 illustrates a structure of a plurality of microcells 100 before they are filled and sealed. Each microcell comprises a bottom 101, walls 102, and an opening 103.

B. Structure of Electro-Optic Devices Comprising Microcell Structures

Figure 2:
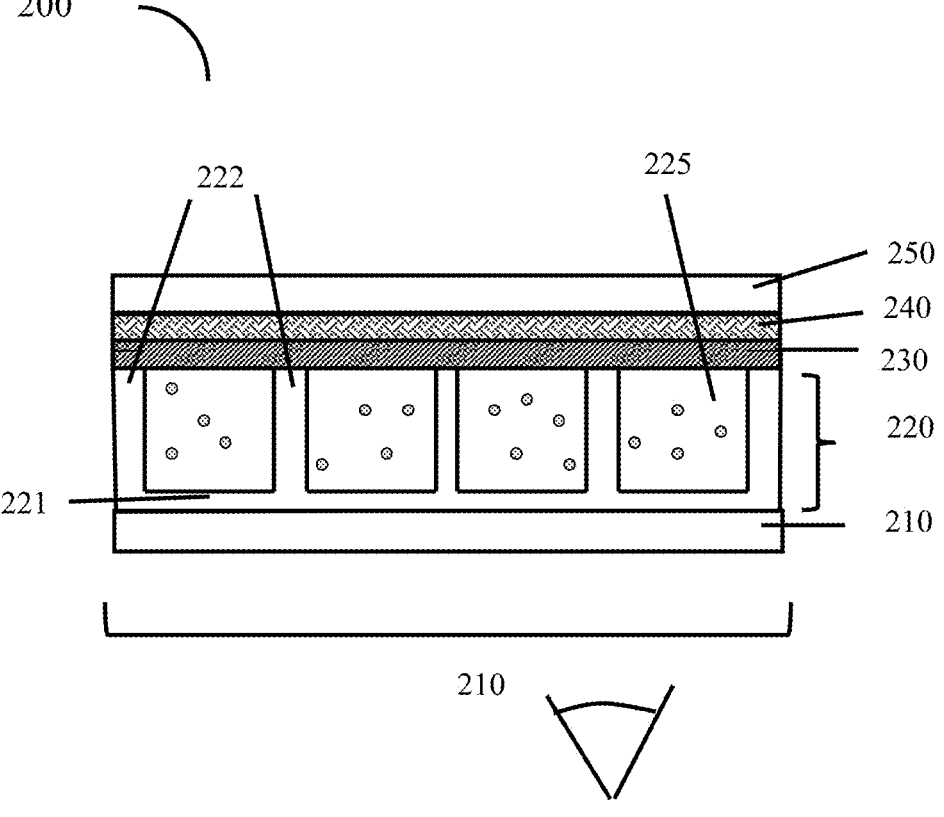
FIG. 2 illustrates an example of an electro-optic device comprising a microcell structure.

FIG. 2 illustrates an example of electro-optic device 200 comprising microcell structure 220. This example of electro-optic device 200 comprises first light-transmissive electrode layer 210, microcell layer 220, sealing layer 230, adhesive layer 240, and second electrode layer 250. The microcell layer comprises a plurality of microcells that are defined by bottom 221 and walls 222. Each of the plurality of microcells contains electrophoretic medium 225, which comprises charged particles in a non-polar fluid. The microcells are sealed with sealing layer 230, which spans the openings of the plurality of the microcells. Second electrode layer 250 is connected to sealing layer 230 with adhesive layer 240. The plurality of microcells and the sealing layer comprise the electro-optic material layer of electro-optic device 200. A source of an electric field (not shown) may connect first light-transmissive electrode layer 210 with second electrode layer 250. Application of an electric field across the electro-optic material layer causes the charge particles to migrate through the electrophoretic medium, creating an image that can be observed by an observer looking from viewing side 210 of electro-optic device 200. An optional primer layer (not shown in FIG. 2) may be disposed between first light-transmissive electrode layer 210 and the plurality of microcells 230.

Figure 3:
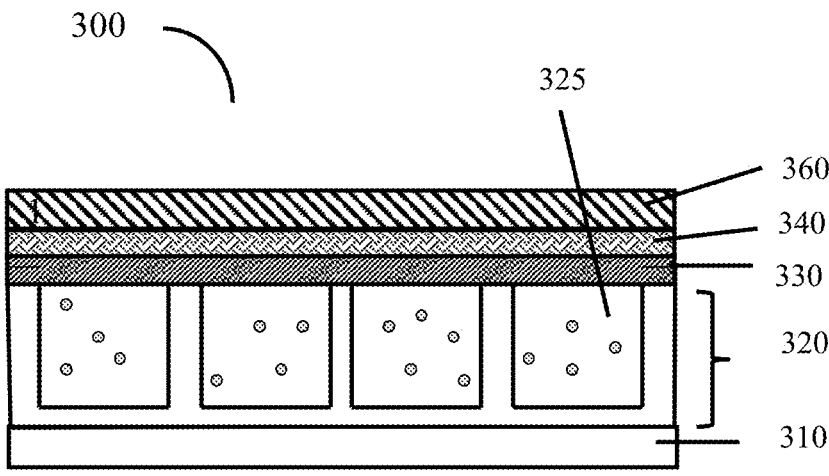
FIG. 3 illustrates an example of a front plane laminate assembly that can be used to form an electro-optic device comprising a microcell structure.

The example of an electro-optic device illustrated in FIG. 2 may be constructed by front plane laminate 300 that is shown in FIG. 3. Front plane laminate 300 comprises first light-transmissive electrode layer 310, a plurality of microcells 320, sealing layer 330, adhesive layer 340, and release sheet 360. Each of the plurality of microcells contains electrophoretic medium 325, which comprises charged particles in a non-polar fluid. The microcells are sealed with sealing layer 330, which spans the openings of the plurality of the microcells. Release sheet 360 is connected to sealing layer 330 with adhesive layer 340. Removal of release sheet 360 exposes the surface of adhesive layer 340, which may be connected onto a second electrode layer to form an electro-optic device. An optional primer layer (not shown in FIG. 3) may be disposed between first light-transmissive electrode layer 310 and the plurality of microcells 330.

Figure 4:
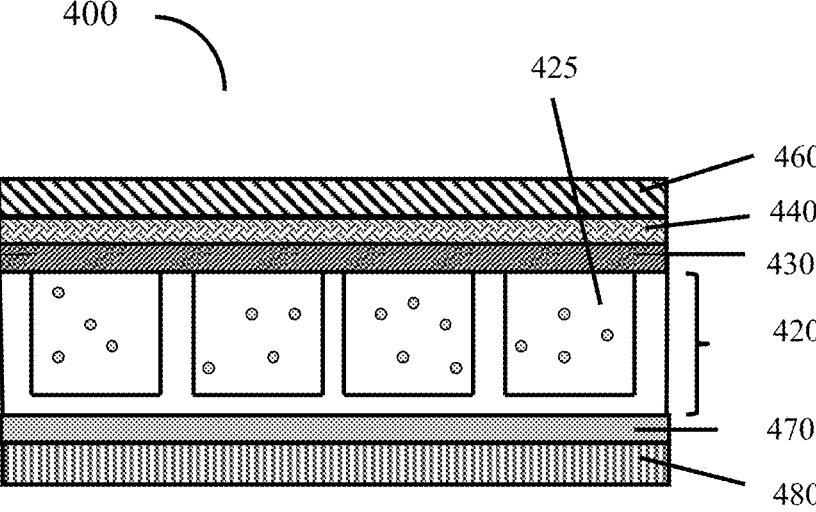
FIG. 4 illustrates an example of a double release sheet that can be used to form an electro-optic device comprising a microcell structure.

The example of an electro-optic device illustrated in FIG. 2 may be also constructed by double release sheet 400 that is shown in FIG. 4. Double release sheet 400 comprises first release sheet 480, first adhesive layer 470, a plurality of microcells 420, sealing layer 430, second adhesive layer 440, and second release sheet 460. Each of the plurality of microcells contains electrophoretic medium 425, which comprises charged particles in a non-polar fluid. The microcells are sealed with sealing layer 430, which spans the openings of the plurality of the microcells. First release sheet 480 is connected to the plurality of microcells 420 with first adhesive layer 470. The second release sheet is connected to sealing layer 430 with second adhesive layer 440. Removal of first release sheet 460 exposes the surface of first adhesive layer 470, which may be connected onto a first light-transmissive electrode layer. Removal of second release sheet 460 exposes the surface of second adhesive layer 440, which may be connected onto a second electrode layer to form an electro-optic device. An optional primer layer (not shown in FIG. 4) may be disposed between first adhesive layer 470 and the plurality of microcells 430.

C. Formation of Microcell Structures

Figure 5:
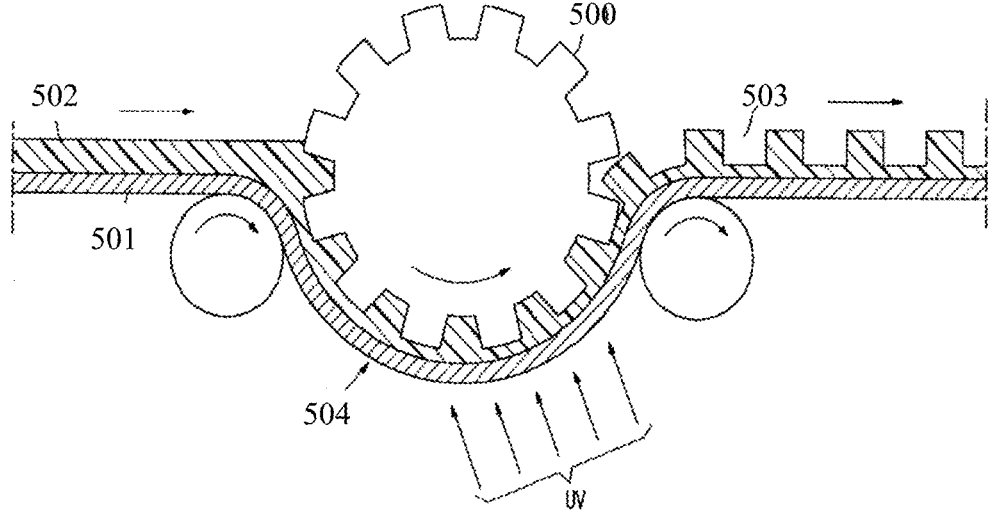
FIG. 5 shows a method for making microcells using a roll-to-roll process.

Techniques for constructing microcells. Microcells may be formed either in a batchwise process or in a continuous roll-to-roll process as disclosed in U.S. Pat. No. 6,933,098. The latter offers a continuous, low cost, high throughput manufacturing technology for production of compartments for use in a variety of applications including benefit agent delivery and electrophoretic displays. Microcell arrays suitable for use with the invention can be created with micro-embossing, as illustrated in FIG. 5. Male mold 500 may be placed either above web 504 or below web 504 (not shown); however, alternative arrangements are possible. For examples, please see U.S. Pat. No. 7,715,088, which is incorporated herein by reference in its entirety. A conductive substrate may be constructed by forming conductor film 501 on polymer substrate that becomes the backing layer for a device. A composition comprising a thermoplastic, thermoset, or a precursor thereof 502 is then coated on the conductor film. The thermoplastic or thermoset precursor layer is embossed at a temperature higher than the glass transition temperature of the thermoplastics or thermoset precursor layer by the male mold in the form of a roller, plate or belt.

The thermoplastic or thermoset precursor for the preparation of the microcells may be multifunctional acrylate or methacrylate, vinyl ether, epoxide and oligomers or polymers thereof, and the like. A combination of multifunctional epoxide and multifunctional acrylate is also very useful to achieve desirable physico-mechanical properties. A crosslinkable oligomer imparting flexibility, such as urethane acrylate or polyester acrylate, may be added to improve the flexure resistance of the embossed microcells. The composition may contain polymer, oligomer, monomer and additives or only oligomer, monomer and additives. The glass transition temperatures (or $T_g$) for this class of materials usually range from about −70° C. to about 150° C., or from about −20° C. to about 50° C. The microembossing process is typically carried out at a temperature higher than the $T_g$. A heated male mold or a heated housing substrate against which the mold presses may be used to control the microembossing temperature and pressure.

As shown in FIG. 5, the mold is released during or after the precursor layer is hardened to reveal an array of microcells 503. The hardening of the precursor layer may be accomplished by cooling, solvent evaporation, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer. A male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. The mold is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition. The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol. 3099, pp. 76-82 (1997). Alternatively, the mold can be made by photomachining using plastics, ceramics or metals.

Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coating, dipping, pouring or the like, over the male mold. The dispenser may be moving or stationary. A conductor film is overlaid the UV curable resin. Pressure may be applied, if necessary, to ensure proper bonding between the resin and the plastic and to control the thickness of the floor of the microcells. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin, which should have a good release property against the mold surface.

Microcell arrays for the invention typically include a pre-formed conductor film, such as indium tin oxide (ITO) conductor lines; however, other conductive materials, such as silver or aluminum, may be used. The conductive layer may be backed by or integrated into substrates such as polyethylene terephthalate, polyethylene naphthalate, polyaramid, polyimide, polycycloolefin, polysulfone, epoxy and their composites. The conductor film may be coated with a radiation curable polymer precursor layer. The film and precursor layer are then exposed imagewise to radiation to form the microcell wall structure. Following exposure, the precursor material is removed from the unexposed areas, leaving the cured microcell walls bonded to the conductor film/support web. The imagewise exposure may be accomplished by UV or other forms of radiation through a photomask to produce an image or predetermined pattern of exposure of the radiation curable material coated on the conductor film. Although it is generally not required, the mask may be positioned and aligned with respect to the conductor film, i.e., ITO lines, so that the transparent mask portions align with the spaces between ITO lines, and the opaque mask portions align with the ITO material (intended for microcell cell floor areas).

Figures 6A, 6B:
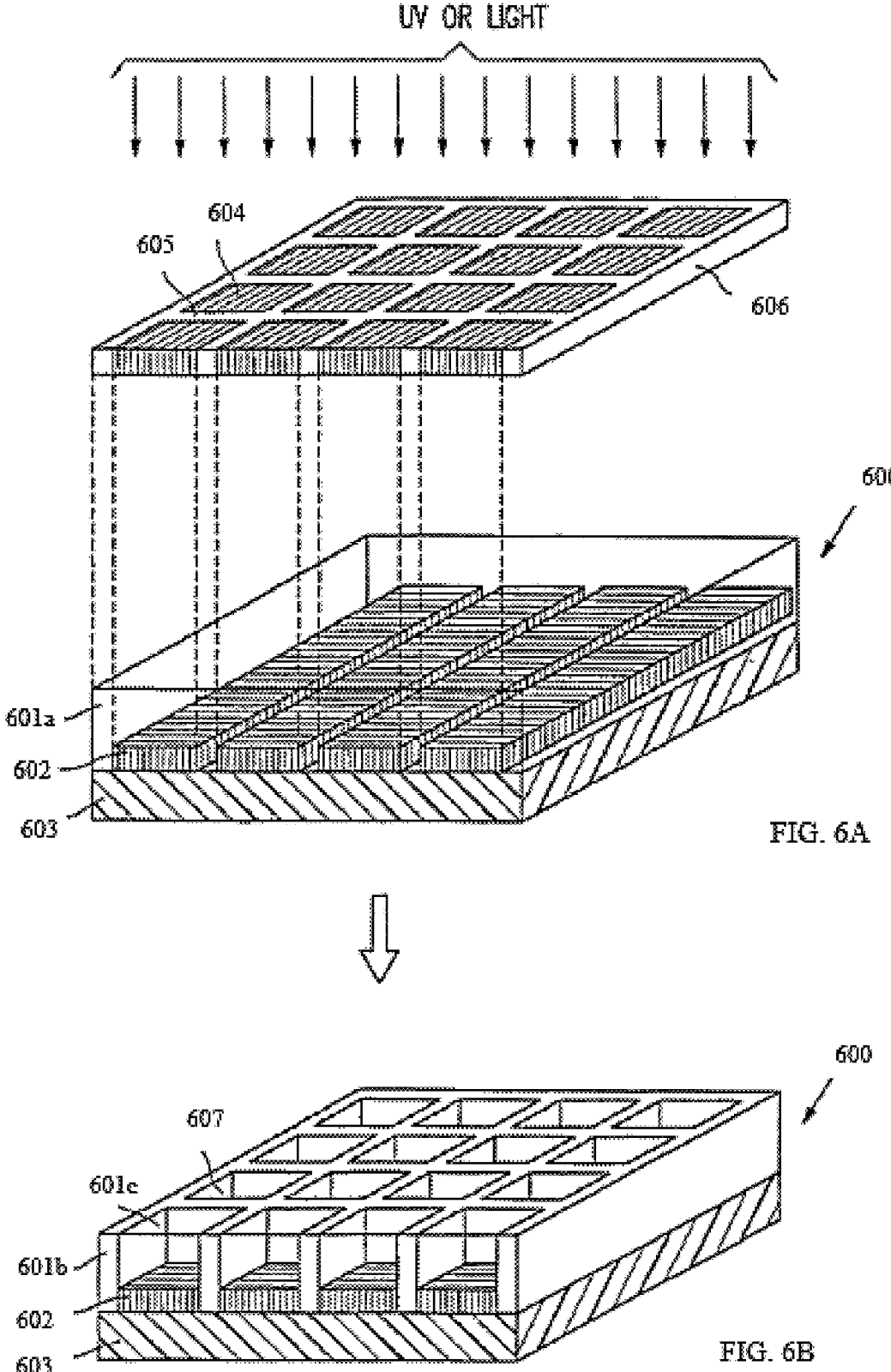
FIGS. 6A and 6B detail the production of microcells using photolithographic exposure through a photomask of a conductor film coated with a thermoset precursor.

Photolithography. Microcells can also be produced using photolithography. Photolithographic processes for fabricating a microcell array are illustrated in FIGS. 6A and 5B. As shown in FIGS. 6A and 6B, the microcell array 600 may be prepared by exposure of radiation curable material 601a coated by known methods onto conductor electrode film 602 to UV light (or alternatively other forms of radiation, electron beams and the like) through mask 606 to form walls 601b corresponding to the image projected through the mask 606. Base conductor film 602 is preferably mounted on supportive substrate base web 603, which may comprise a plastic material.

In the photomask 606 in FIG. 6A, dark squares 604 represent the opaque area and the space between the dark squares represents transparent area 605 of mask 606. The UV radiates through transparent area 605 onto radiation curable material 601a. The exposure is preferably performed directly onto radiation curable material 601a, i.e., the UV does not pass through substrate 603 or base conductor 602 (top exposure). For this reason, neither substrate 603, nor conductor 602, needs to be transparent to the UV or other radiation wavelengths employed.

As shown in FIG. 6B, exposed areas 601b become hardened. The unexposed areas (protected by opaque area 604 of mask 606) are then removed by an appropriate solvent or developer to form microcells 607. The solvent or developer is selected from those commonly used for dissolving or reducing the viscosity of radiation curable materials such as methylethylketone (MEK), toluene, acetone, isopropanol or the like. The preparation of the microcells may be similarly accomplished by placing a photomask underneath the conductor film/substrate support web and in this case the UV light radiates through the photomask from the bottom and the substrate needs to be transparent to radiation.

Figure 6C:
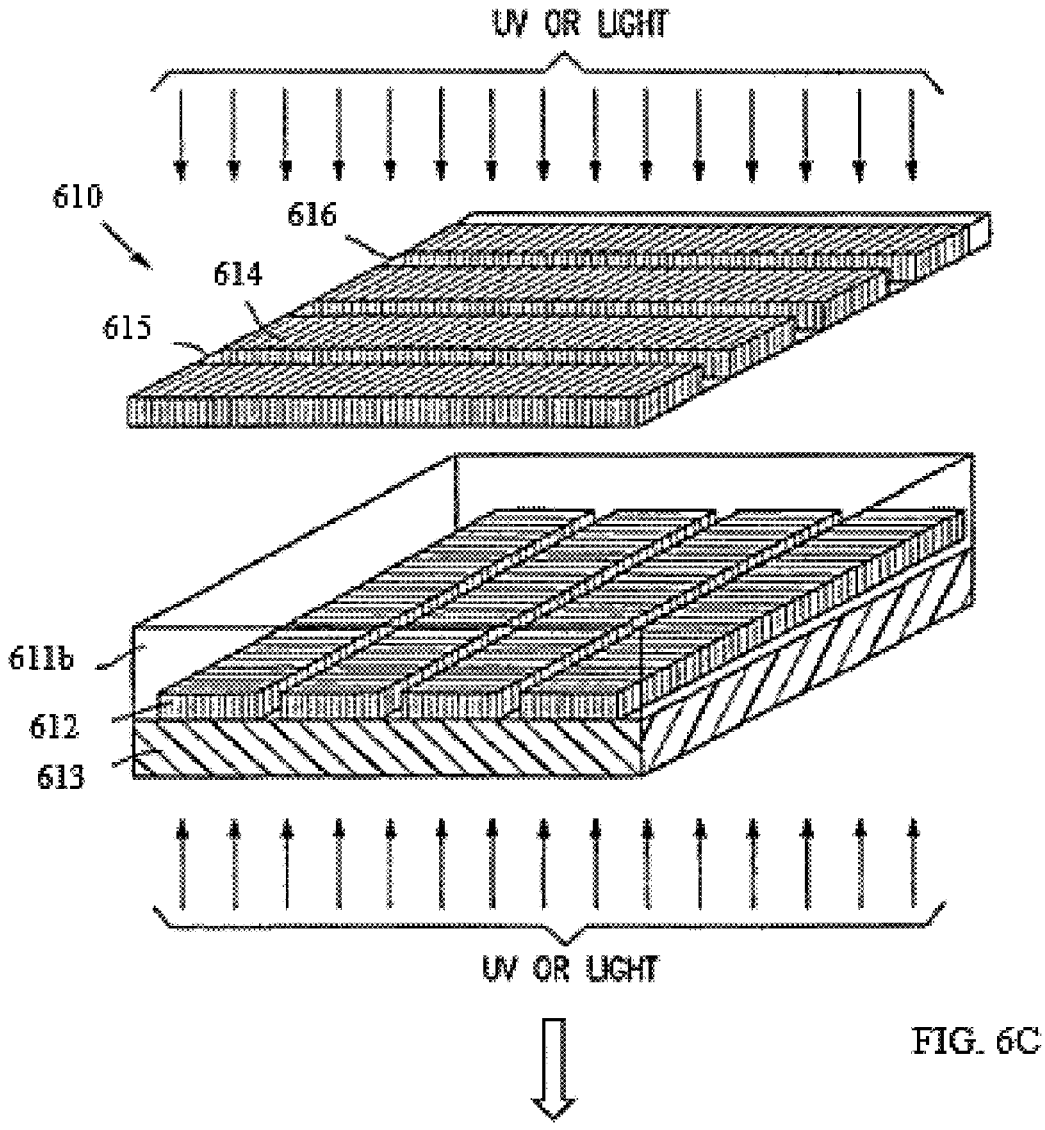
FIGS. 6C and 6D detail an alternate embodiment in which are fabricated using photolithography.
Figure 6D:
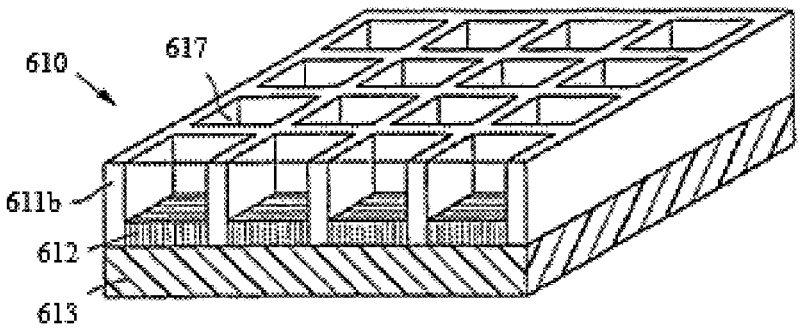

Imagewise Exposure. Still another alternative method for the preparation of the microcell array of the invention by imagewise exposure is illustrated in FIGS. 6C and 6D. When opaque conductor lines are used, the conductor lines can be used as the photomask for the exposure from the bottom. Durable microcell walls are formed by additional exposure from the top through a second photomask having opaque lines perpendicular to the conductor lines. FIG. 6C illustrates the use of both the top and bottom exposure principles to produce the microcell array 610 of the invention. Base conductor film 612 is opaque and line-patterned. Radiation curable material 611a, which is coated on base conductor 612 and substrate 613, is exposed from the bottom through conductor line pattern 612, which serves as the first photomask. A second exposure is performed from the "top" side through second photomask 616 having a line pattern perpendicular to conductor lines 612. Spaces 615 between lines 614 are substantially transparent to the UV light. In this process, wall material 611b is cured from the bottom up in one lateral orientation, and cured from the top down in the perpendicular direction, joining to form integral microcell 617. As shown in FIG. 6D, the unexposed area is then removed by a solvent or developer as described above to reveal microcells 617.

The microcells may be constructed from thermoplastic elastomers, which have good compatibility with the microcells and do not interact with the media Examples of useful thermoplastic elastomers include ABA, and (AB)n type of di-block, tri-block, and multi-block copolymers wherein A is styrene, $\alpha$-methylstyrene, ethylene, propylene or norbornene; B is butadiene, isoprene, ethylene, propylene, butylene, dimethylsiloxane or propylene sulfide; and A and B cannot be the same in the formula. The number, n, is $\geq 1$, preferably 1-10. Particularly useful are di-block or tri-block copolymers of styrene or ox-methylstyrene such as SB (poly(styrene-b-butadiene)), SBS (poly(styrene-b-butadiene-b-styrene)), SIS (poly(styrene-b-isoprene-b-styrene)), SEBS (poly(styrene-b-ethylene/butylenes-b-stylene)) poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene), poly(α-methylstyrene-b-dimethylsiloxane-b-α-methylstyrene). Commercially available styrene block copolymers such as Kraton D and G series (from Kraton Polymer, Houston, Tex.) are particularly useful. Crystalline rubbers such as poly(ethylene-co-propylene-co-5-methylene-2-norbornene) or EPDM (ethylene-propylene-diene terpolymer) rubbers such as Vistalon 6505 (from Exxon Mobil, Houston, Tex.) and their grafted copolymers have also been found very useful.

The thermoplastic elastomers may be dissolved in a solvent or solvent mixture, which is immiscible with the carrier in the microcells and exhibits a specific gravity less than that of the carrier. Low surface tension solvents are preferred for the overcoating composition because of their better wetting properties over the microcell walls and the fluid. Solvents or solvent mixtures having a surface tension lower than 35 dyne/cm are preferred. A surface tension of lower than 30 dyne/cm is more preferred. Suitable solvents include alkanes (preferably $C_{6-12}$ alkanes such as heptane, octane or Isopar solvents from Exxon Chemical Company, nonane, decane and their isomers), cycloalkanes (preferably $C_{6-12}$ cycloalkanes such as cyclohexane and decalin and the like), alkylbezenes (preferably mono- or di-$C_{1-6}$ alkyl benzenes such as toluene, xylene and the like), alkyl esters (preferably $C_{2-5}$ alkyl esters such as ethyl acetate, isobutyl acetate and the like) and $C_{3-5}$ alkyl alcohols (such as isopropanol and the like and their isomers). Mixtures of alkylbenzene and alkane are particularly useful.

In addition to polymer additives, the polymer mixtures may also include wetting agents (surfactants). Wetting agents (such as the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn.) may also be included in the composition to improve the adhesion of the sealant to the microcells and provide a more flexible coating process. Other ingredients including cross-linking agents (e.g., bisazides such as 4,4'-diazidodiphenyl-methane and 2,6-di-(4'-azidobenzal)-4-methylcyclohexanone), vulcanizers (e.g., 2-benzothiazolyl disulfide and tetramethylthiuram disulfide), multifunctional monomers or oligomers (e.g., hexanediol, diacrylates, trimethylolpropane, triacrylate, divinylbenzene, diallylphthalene), thermal initiators (e.g., dilauroryl peroxide, benzoyl peroxide) and photoinitiators (e.g., isopropyl thioxanthone (ITX), Irgacure 651 and Irgacure 369 from Ciba-Geigy) are also highly useful to enhance the physico-mechanical properties of the sealing layer by crosslinking or polymerization reactions during or after the overcoating process.

The microcell array 700 may be prepared by any of the methods described above. As shown in cross-section in FIGS. 7A-7D, microcell walls 702 extend upward from backing layer 701 and conducive layer 710 to form the open microcells. In an embodiment, conductive layer 710 is formed on or at backing layer 701. While FIGS. 7A-7D show conductive layer 710 is continuous and running above backing layer 701, it is also possible that conductive layer 710 is continuous and running below or within backing layer 701 or it is interrupted by microcell walls 702. Prior to filling, microcell array 700 may be cleaned and sterilized to assure that the benefit agents are not compromised prior to use.

The microcells are next filled with electrophoretic medium 725, which comprises charged particles in a non-polar fluid to form a plurality of filled microcells 770. The microcells may be filled using a variety of techniques. In some embodiments, blade coating may be used to fill the microcells to the depth of microcell walls 702. In other embodiments, inkjet-type microinjection can be used to fill the microcells. In yet other embodiments, microneedle arrays may be used to fill an array of microcells with electrophoretic medium 725.

Figure 7A:
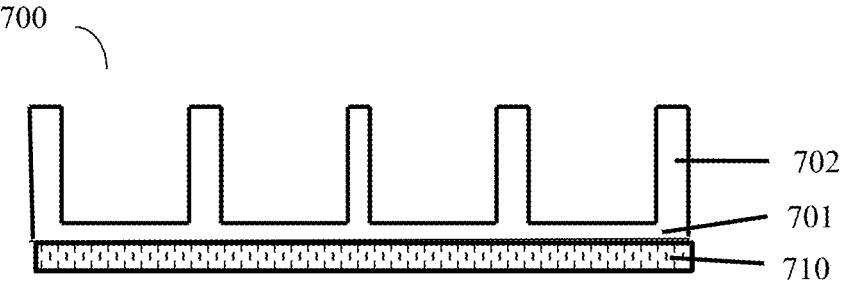
FIGS. 7A-7D illustrate the steps of filling and sealing an array of microcells.
Figure 7B:
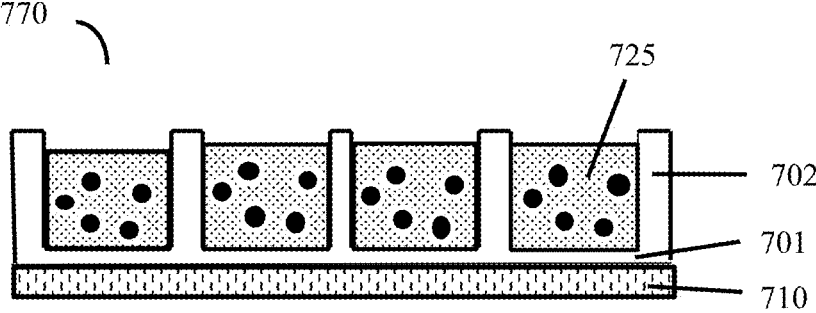
Figure 7C:
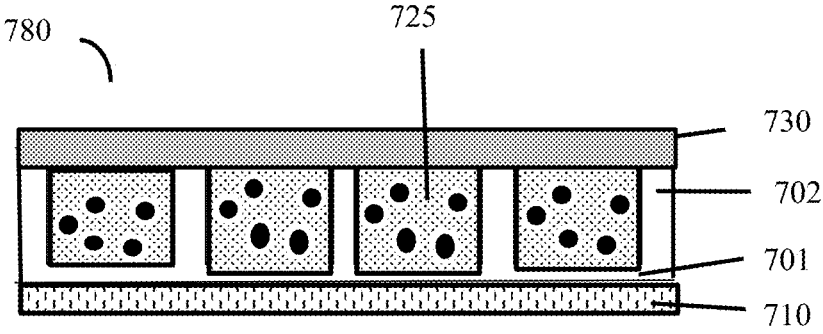

As shown in FIG. 7C, after filling, the microcells are sealed by applying an aqueous polymer composition to form sealed microcells 780, comprising sealing layer 730. In some embodiments, the sealing process may involve exposure to heat, dry hot air, or UV radiation. The sealing layer must have good barrier properties for the non-polar fluid of electrophoretic medium 725.

In alternate embodiments, a variety of individual microcells may be filled with the desired mixture by using iterative photolithography. The process typically includes coating an array of empty microcells with a layer of positively working photoresist, selectively opening a certain number of the microcells by image-wise exposing the positive photoresist, followed by developing the photoresist, filling the opened microcells with the desired mixture, and sealing the filled microcells by a sealing process. These steps may be repeated to create sealed microcells filled with other mixtures. This procedure allows for the formation of large sheets of microcells having the desired ratio of mixtures or concentrations.

The sealing of the filled microcells may be accomplished in a number of ways. One approach involves the mixing of the aqueous polymer composition with the electrophoretic medium composition. The aqueous polymer composition may be immiscible with the electrophoretic medium composition, preferably having a specific gravity lower than that of the electrophoretic medium composition. The two compositions, the aqueous polymer composition and the electrophoretic medium composition, are thoroughly mixed and immediately coated onto the plurality of microcells with a precision coating mechanism such as Meyer bar, gravure, doctor blade, slot coating or slit coating. Excess fluid is scraped away by a wiper blade or a similar device. A small amount of a weak solvent or solvent mixture such as isopropanol, methanol or an aqueous solution thereof may be used to clean the residual fluid on the top surface of the partition walls of the microcells. The aqueous polymer composition is subsequently separated from the electrophoretic medium composition and floats on top of the electrophoretic medium composition. Alternatively, after the mixture of the electrophoretic medium composition and the aqueous polymer composition is filled into the microcells, a substrate may be laminated on top to control the metering of the mixture of compositions and to facilitate the phase separation of the aqueous polymer composition from the electrophoretic medium composition to form a uniform sealing layer. The substrate used can be a functional substrate in the final structure or can be a sacrifice substrate, for example, a release substrate, which can be removed afterwards. A sealing layer is then formed by hardening the aqueous polymer composition in situ (i.e., when in contact with the electrophoretic medium composition). The hardening of the aqueous polymer composition may be accomplished by UV or other forms of radiation such as visible light, IR or electron beam. Alternatively, heat or moisture may also be employed to harden the aqueous polymer composition position if a heat or moisture curable composition is used.

In a second approach, the electrophoretic medium composition may be filled into the microcells first and an aqueous polymer composition is subsequently overcoated onto the filled microcells. The overcoating may be accomplished by a conventional coating and printing process, such as blanket coating, inkjet printing or other printing processes. A sealing layer, in this approach, is formed in situ, by hardening the aqueous polymer composition by solvent evaporation, radiation, heat, moisture, or an interfacial reaction. Interfacial polymerization followed by UV curing is beneficial to the sealing process. Intermixing between the electrophoretic medium composition and the sealing overcoat is significantly suppressed by the formation of a thin barrier layer at the interface by interfacial polymerization/ The sealing is then completed by a post curing step, for example, by UV radiation. The degree of intermixing may be further reduced when the specific gravity of the aqueous polymer composition is lower than that of the electrophoretic medium composition. Volatile organic solvents may be used to adjust the viscosity and thickness of the sealing overcoat. Rheology of the aqueous polymer composition may be adjusted for optimal sealability and coatability. When a volatile solvent is used in the overcoat, it is preferred that it is immiscible with the solvent in the electrophoretic medium composition.

Figure 7D:
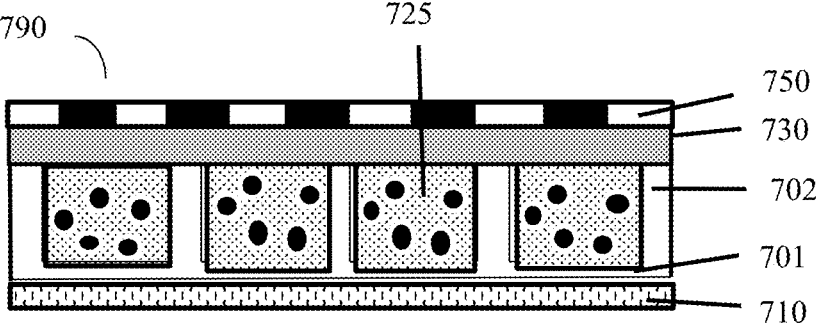

After the microcells are filled and sealed, the sealed array may be laminated with a second electrode layer 750 comprising a plurality of electrodes. Second electrode layer 750 is attached onto sealing layer 730 to form electro-optic device 790 as shown in FIG. 7D. An adhesive may be used to attach second electrode layer 750 onto sealing layer 730 (the adhesive layer is not shown in FIG. 7D. The adhesive may be electrically conductive. The adhesive of the adhesive layer, which may be a pressure sensitive adhesive, a hot melt adhesive, or a heat, moisture, or radiation curable adhesive. The laminate adhesive may be post-cured by radiation such as UV through the top conducting layer if the latter is transparent to the radiation. In other embodiments, the plurality of electrodes may be bonded directly to the sealed array of the microcell.

In general, the microcells can be of any shape, and their sizes and shapes may vary. The microcells may be of substantially uniform size and shape in one system. However, it is possible to have microcells of mixed shapes and sizes. The openings of the microcells may be round, square, rectangular, hexagonal or any other shape. The size of the partition area between the openings may also vary. The dimension of each individual microcell may be in the range of about $1 \times 10^1$ to about $1 \times 10^6$ $\mu m^2$, or from about $1 \times 10^2$ to about $1 \times 10^6$ $\mu m^2$, or from about $1 \times 10^3$ to about $1 \times 10^5$ $\mu m^2$.

The depth of the microcells may be in the range of about 5 to about 200 $\mu m$, or from about 10 to about 100 $\mu m$. The opening to the total area ratio is in the range of from about 0.05 to about 0.95, or from about 0.4 to about 0.9.

An electrophoretic display normally comprises an electro-optic material layer and at least two other layers disposed on opposed sides of the electro-optic material layer, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electro-optic material layer comprises an electrode, the layer on the opposed side of the electro-optic material layer typically being a protective layer intended to prevent the movable electrode damaging the electro-optic material layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating on a plastic film. Separately, a backplane, containing an array of pixel electrodes and an appropriate arrangement of conductors to connect the pixel electrodes to drive circuitry, is prepared. To form the final display, the substrate having the electro-optic material layer is laminated to the backplane using a lamination adhesive.

The aforementioned U.S. Pat. No. 6,982,178 describes a method of assembling a solid electrophoretic display, which is well adapted for mass production. Essentially, this patent describes a so-called "front plane laminate" ("FPL") which comprises, in order, a light-transmissive electrode layer; an electro-optic material layer in electrical contact with light-transmissive electrode layer; an adhesive layer; and a release sheet. Typically, the light-transmissive electrode layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electrophoretic medium, which will normally be viewed through the light-transmissive electrode layer and adjacent substrate (if present); in cases where the electrophoretic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The light-transmissive electrode layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate. Assembly of an electrophoretic display using such a front plane laminate may be effected by removing the release sheet from the front plane laminate and contacting the adhesive layer with the backplane under conditions effective to cause the adhesive layer to adhere to the backplane, thereby securing the adhesive layer, electro-optic material layer, and light-transmissive electrode layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises an electro-optic material layer sandwiched between two adhesive layers, one or both of the adhesive layers being covered by a release sheet. Another form of the double release sheet comprises a solid electro-optic material layer sandwiched between two release sheets. Both forms of the double release film are intended for use in a process generally similar to the process for assembling an electrophoretic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired. U.S. Pat. No. 7,839,564 describes a so-called "inverted front plane laminate", which is a variant of the front plane laminate described in the aforementioned U.S. Pat. No. 6,982,178. This inverted front plane laminate may comprise, in order, at least one of a light-transmissive protective layer and a light-transmissive electrode layer; an adhesive layer; an electro-optic material layer; and a release sheet. This inverted front plane laminate is used to form an electrophoretic display having a layer of lamination adhesive between the electro-optic material layer and the light-transmissive electrode layer; a second, typically thin layer of adhesive may or may not be present between the electro-optic material layer and a backplane. Such electrophoretic displays can combine good resolution with good low temperature performance.

Electrophoretic Medium.

The electrophoretic medium, in the context of the present invention, refers to the composition in the microcells. For display applications, the microcells may be filled with at least one type of charged pigment particles in a non-polar fluid. The electrophoretic medium may comprise one type of charged type of particles or more than one type of particles having different colors, charges and charge polarities. The charged particles move through the electrophoretic medium under the influence of an electric field applied across the electro-optic material layer. The charged particles may be inorganic or organic pigments having polymeric surface treatments to improve their stability. The electrophoretic medium may comprise pigments having white, black, cyan, magenta, yellow, blue, green red, and other colors. The electrophoretic medium may also comprise, charge control agents charge adjuvants, rheology modifies, and other additives. Examples of non-polar fluids include hydrocarbons such as Isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-coming (DC-200).

Sealing Layer

The sealing layer must provide barrier to the electrophoretic medium so that the non-polar fluid will not be removed from the plurality of microcells. Furthermore, the sealing layer must not negatively affect the electro-optic performance of the device.

One important property of the sealing layer is its electrical volume resistivity. If the resistivity of the sealing layer is too high, a substantial voltage drop will occur within the sealing layer, requiring an increase in voltage across the electrodes to operate the device. Increasing the voltage across the electrodes in this manner is undesirable, since it increases the power consumption of the display, and may require the use of more complex and expensive control circuitry to handle the increased voltage. On the other hand, if the sealing is too low, an undesirable cross talk between adjacent pixel electrodes is observed, reducing the image quality. In addition, because the volume resistivity typically increases rapidly with decreasing temperature, too high volume resistivity of the sealing layer negatively affects the low temperature electro-optic performance of the display. The sealing layer may have volume resistivity of $4 \times 10^7$ Ohm·cm or higher. The sealing layer may have volume resistivity of $5 \times 10^7$ Ohm·cm or higher. The sealing layer may have volume resistivity of $10^8$ Ohm·cm or higher. The sealing layer may have volume resistivity of from $5 \times 10^7$ to $10^{12}$ Ohm·cm, or from $10^8$ to $10^{10}$ Ohm·cm. The sealing layer may have volume resistivity of $10^{10}$ or less.

Another important property of the sealing layer, other than barrier property and volume resistivity, is its moisture absorption. If the sealing layer absorbs significant amount of moisture from the environment over time, the electro-optic performance of the device becomes inferior.

The inventors of the present invention found that sealing layers that have total surface energy higher than 55 mN/m that were formed by aqueous polymer compositions comprising a combination of a water soluble poly(vinyl alcohol) homopolymer or poly(vinyl alcohol-co-ethylene) copolymer and a polyurethane, a conductive filler having total surface energy of higher than 40 mN/m, and an aqueous carrier, provide excellent barrier properties.

The inventors of the present invention also found that sealing layers comprising a combination of a water soluble poly(vinyl alcohol) homopolymer or poly(vinyl alcohol-co-ethylene) copolymer, a polyurethane, and a conductive filler form sealing layers of electro-optic displays, the electro-optic displays having excellent electro-optic performance especially at low temperatures.

The sealing layer may comprise (i) from 30 to 70 weight % of a water soluble poly(vinyl alcohol) homopolymer or poly(vinyl alcohol-co-ethylene) copolymer by weight of the sealing layer excluding solvents, (ii) from 7 to 29 weight % of a polyurethane by weight of the sealing layer excluding solvents; and (iii) from 1 to 45 weight % of a conductive filler by weight of the sealing layer excluding solvents. The poly(vinyl alcohol) homopolymer may have a degree of hydrolysis of from 90 to 99.5%, and the poly(vinyl alcohol-co-ethylene) copolymer may have a degree of hydrolysis of from 90 to 99.5% and ethylene content of less than 10 The degree of hydrolysis of the poly(vinyl alcohol) homopolymer and the poly(vinyl alcohol-co-ethylene) copolymer may be from 92 to 99%, or from 93 to 99%, or from 92 to 98%, or from 92 to 96%, or from 95 to 99%, or from 92 to 95%. The ethylene content of the poly(vinyl alcohol-co-ethylene) copolymer may be less than 9%, or less than 8.5%, or less than 8%. The ethylene content of the poly(vinyl alcohol-co-ethylene) copolymer may be from 7 to 11%, or from 8 to 10%, or from 8 to 9%, or from 9 to 11%, or from 10 to 11%. The degree of hydrolysis of homopolymers and copolymers of polyvinyl alcohols is routinely reported by manufactures of such polymer and it indicates the proportion by units (moles) of vinyl alcohol in the polymer to the total vinyl units. The other units are typically vinyl acetate (ester). The ethylene content of poly(vinyl alcohol-co-ethylene) copolymers is also reported by the manufacturers and represents the proportion of units (moles) of ethylene in the polymer to the other units. In this case, the other unit is vinyl alcohol.

The sealing layer may be formed by an aqueous polymer composition. The aqueous polymer composition may comprise (i) from 30 to 70 weight % of a water soluble poly(vinyl alcohol) homopolymer or poly(vinyl alcohol-co-ethylene) copolymer by weight of the aqueous polymer composition excluding solvents, (ii) from 7 to 29 weight % of a polyurethane by weight of the aqueous polymer composition excluding solvents; and (iii) from 1 to 45 weight % of a conductive filler by weight of the aqueous polymer composition excluding solvents, and (iv) an aqueous carrier. The poly(vinyl alcohol) homopolymer may have a degree of hydrolysis of from 90 to 99.5%, and the poly(vinyl alcohol-co-ethylene) copolymer may have a degree of hydrolysis of from 90 to 99.5% and ethylene content of less than 10%. The degree of hydrolysis of the poly(vinyl alcohol) homopolymer and the poly(vinyl alcohol-co-ethylene) copolymer may be from 92 to 99%, or from 92 to 95%. The ethylene content of the poly(vinyl alcohol-co-ethylene) copolymer may be less than 9%, or less than 8.5%, or less than 8%. The degree of hydrolysis of homopolymers and copolymers of polyvinyl alcohols is routinely reported by manufactures of such polymer and it indicates the proportion by units (moles) of vinyl alcohol in the polymer to the total vinyl units. The other units are typically vinyl acetate (ester). The ethylene content of poly(vinyl alcohol-co-ethylene) copolymers is also reported by the manufacturers and represent the proportion of units (moles) of ethylene in the polymer to the other units. In this case, the other unit is vinyl alcohol. Application, drying or curing of the aqueous polymer composition, forms a sealing layer having (i) from 30 to 70 weight % of a water soluble poly(vinyl alcohol) homopolymer or poly(vinyl alcohol-co-ethylene) copolymer by weight of the sealing layer excluding solvents, and (ii) from 7 to 29 weight % of a polyurethane by weight of the sealing layer excluding solvents. The sealing layer may have some residual water and other solvents that remain in the layer after drying or curing.

The sealing layer may comprise from 30 to 70 weight %, or from 30 to 65 weight %, or from 30 to 60 weight %, or from 30 to 55 weight %, or from 30 to 50 weight %, or from 35 to 70 weight %, or from 35 to 65 weight %, or from 35 to 60 weight %, or from 35 to 55 weight %, or from 35 to 50 weight %, or from 40 to 70 weight %, or from 40 to 65 weight %, or from 40 to 60 weight %, or from 40 to 55 weight % of a water soluble poly(vinyl alcohol) homopolymer or poly(vinyl alcohol-co-ethylene) copolymer by weight of the aqueous polymer composition excluding solvents.

The sealing layer may comprise from 7 to 29 weight %, or from 10 to 29 weight %, or from 15 to 29 weight %, or from 17 to 29 weight %, or from 18 to 29 weight %, or from 20 to 29 weight %, or from 10 to 25 weight %, or from 15 to 25 weight %, or from 17 to 25 weight %, or from 18 to 25 weight %, or from 20 to 25 weight %, or from 10 to 21 weight %, or from 15 to 21 weight %, or from 17 to 21 weight %, of a polyurethane by weight of the aqueous polymer composition excluding solvents.

The sealing layer may comprise a ratio a weight ratio of water soluble poly(vinyl alcohol) homopolymer or poly(vinyl alcohol-co-ethylene) copolymer to polyurethane of from 4.0 to 1.2, or from 3.5 to 1.2, or from 3.3 to 1.2, or from 3.0 to 1.2, or from 2.5 to 1.2, or from 4.0 to 1.5, or from 3.5 to 1.5, or from 3.3 to 1.5, or from 3.0 to 1.5, or from 2.5 to 1.5, or from 4.0 to 1.8, or from 3.5 to 1.8, or from 3.3 to 1.8, or from 3.0 to 1.8 or from 2.5 to 1.8, or from 4.0 to 2.2, or from 3.5 to 2.2, or from 3.3 to 2.2, or from 3.0 to 2.2 or from 2.5 to 2.2.

The poly(vinyl alcohol) homopolymer and the poly(vinyl alcohol-co-ethylene) copolymer of the sealing layer may have weight average molecular weight (MW) of from 1,000 to 1,000,000 Daltons, or from 10,000 to 500,000 Daltons, or from 20,000 to 400,000 Daltons.

Polyurethanes are typically prepared via a polyadditional process involving a diisocyanate. Non-limiting examples of polyurethanes include polyether polyurethanes, polyester polyurethanes, polycarbonate polyurethanes, polyether polyureas, polyureas, polyester polyureas, polyester polyureas, polyisocyanates (e.g., polyurethanes comprising isocyanate bonds), and polycarbodiimides (e.g., polyurethanes comprising carbodiimide bonds). Generally, the polyurethane contains urethane groups. The polyurethanes utilized in the aqueous polymer compositions and sealing layers described herein may be prepared using methods known in the art. Preferably, the polyurethanes of the aqueous polymer composition of the present inventions are polyester polyurethanes, polycarbonate polyurethanes, and mixtures thereof.

The polyurethane of the sealing layer may have weight average molecular weight (MW) of from 1,000 to 2,000,000 Daltons, or from 10,000 to 300,000 Daltons, or from 15,000 to 200,000 Daltons.

Good barrier properties were observed for sealing layers that comprise polyurethane with polar component of the surface energy from 10 to 20 mN/m. The polar component of the surface energy of the polyurethane may be from 10 to 25 mN/m, or from 10 to 20 mN/m, or from 11 to 20 mN/m, or from 12 to 20 mN/m, or from 13 to 20 mN/m, or from 14 to 20 mN/m, or from 15 to 20 mN/m, or from 10 to 18 mN/m, or from 11 to 18 mN/m, or from 12 to 18 mN/m, or from 13 to 18 mN/m, or from 14 to 18 mN/m, or from 15 to 18 mN/m, or from 10 to 16 mN/m, or from 11 to 16 mN/m, or from 12 to 16 mN/m, or from 13 to 16 mN/m, or from 14 to 16 mN/m.

The polyurethane of the sealing layer, the sealing layer being formed by an aqueous polymer composition, may be added in the aqueous polymer composition as an aqueous solution or an aqueous dispersion or an aqueous emulsion, or a latex.

The interfacial tension between the water soluble poly(vinyl alcohol) polymer or poly(vinyl alcohol-co-ethylene) copolymer and the polyurethane may be less than 2 mN/m. The interfacial tension between the water soluble poly(vinyl alcohol) polymer or poly(vinyl alcohol-co-ethylene) copolymer and the polyurethane may be less than 1.9 mN/m, or less than 1.8 mN/m, or less than 1 mN/m, or less than 0.8 mN/m, or less than 0.6 mN/m, or less than 0.7 mN/m. The interfacial tension between the water soluble poly(vinyl alcohol) polymer or poly(vinyl alcohol-co-ethylene) copolymer and the polyurethane may be from 0 to 2.0 mN/m, or from 0.1 to 2.0 mN/m, or from 0.2 to 2.0 mN/m, or from 0.3 to 2.0 mN/m, or from 0.4 to 2.0 mN/m, or from 0.5 to 2.0 mN/m, or from 0.6 to 2.0 mN/m, or from 0.7 to 2.0 mN/m, or from 0.8 to 2.0 mN/m, or from 1.0 to 2.0 mN/m, or from 1.5 to 2.0 mN/m, or from 0 to 1.8 mN/m, or from 0.1 to 1.8 mN/m, or from 0.2 to 1.8 mN/m, or from 0.3 to 1.8 mN/m, or from 0.4 to 1.8 mN/m, or from 0.5 to 1.8 mN/m, or from 0.6 to 1.8 mN/m, or from 0.7 to 1.8 mN/m, or from 0.8 to 1.8 mN/m, or from 1.0 to 1.8 mN/m, or from 0 to 1.5 mN/m, or from 0.2 to 1.5 mN/m, or from 0.3 to 1.5 mN/m, or from 0.4 to 1.5 mN/m, or from 0.5 to 1.5 mN/m, or from 0.6 to 1.5 mN/m, or from 0.7 to 1.5 mN/m, or from 0.8 to 1.5 mN/m, or from 1.0 to 1.5 mN/m, or from 0 to 1.0 mN/m, or from 0.1 to 1.0 mN/m, or from 0.2 to 1.0 mN/m, or from 0.3 to 1.0 mN/m, or from 0.4 to 1.0 mN/m, or from 0.5 to 1.0 mN/m, or from 0.6 to 1.0 mN/m, or from 0.7 to 1.0 mN/m, or from 0.8 to 1.0 mN/m, or from 0 to 0.8 mN/m, or from 0.1 to 0.8 mN/m, or from 0.2 to 0.8 mN/m, or from 0.3 to 0.8 mN/m, or from 0.4 to 0.8 mN/m, or from 0.5 to 0.8 mN/m, or from 0 to 0.7 mN/m, or from 0.1 to 0.7 mN/m or from 0.2 to 0.7 mN/m, or from 0.3 to 0.7 mN/m, or from 0.4 to 0.7 mN/m, or from 0 to 0.6 mN/m, or from 0.1 to 0.6 mN/m, or from 0.2 to 0.7 mN/m, or from 0.3 to 0.7 mN/m, or from 0 to 0.6 mN/m, or from 0.1 to 0.6 mN/m, or from 0.2 to 0.6 mN/m, or from 0.3 to 0.6 mN/m, or from 0.4 to 0.6 mN/m, or from 0 to 0.5 mN/m, or from 0.1 to 0.5 mN/m, or from 0.2 to 0.5 mN/m.

The aqueous polymer composition may comprise an aqueous carrier from 40 to 96 weight %, or from 60 to 95 weight %, or from 70 to 92 weight %, or from 80 to 90 weight % by weight of the aqueous polymer composition.

The sealing layer may comprise crosslinked polyurethane.

The polyurethane may be crosslinked by a crosslinker, the crosslinker being a polyisocyanate, a multifunctional polycarbodiimide, a multifunctional aziridine, a silane coupling agent, a boron/titanium/zirconium-based crosslinker, or a melamine formaldehyde. Because the sealing layer is formed by an aqueous polymer composition, the aqueous polymer composition may comprise from 0.5 to 10 weight % of a crosslinker by weight of the aqueous polymer composition excluding solvents. The crosslinker forms chemical bonds between the polyurethane molecules. The crosslinking of the polyurethane of the sealing layer may increase the adhesion between the sealing layer and the microcells. The crosslinker is preferably soluble or dispersible in the aqueous carrier of the aqueous polymer composition. The crosslinker may be a monomer, an oligomer or a polymer. Examples of crosslinkers include polyisocyanates, multifunctional polycarbodiimides, multifunctional aziridines, silane coupling agents, boron/titanium/zirconium-based crosslinkers, or melamine formaldehydes. Polycarbodiimide crosslinkers are reactive at acidic pH conditions. Preferably, the crosslinker is free of sulfosuccinate surfactants.

The aqueous polymer composition that forms the sealing layer may also comprise a pH adjusting agent. The pH adjusting agent is added into the aqueous polymer composition to adjust its pH to a value of from 6.5 to 8.5. An example of a pH adjusting agent is ammonium hydroxide, but a variety of acids and bases can be used. The pH adjusting agent increases the pH of the aqueous polymer composition, which may decrease the rate of crosslinking of the aqueous polymer composition before its use, and provides optimum pH condition for the rheology modifier to interact with the particles of the aqueous polymer composition, improving its efficacy. The pH adjusting agent may be used at a content of from 0.2 weigh % to 1 weight % by weight of aqueous polymer composition excluding solvents.

The sealing layer may also comprise from 0.05 to 10 weight %, or from 0.1 to 5 weight %, or from 0.5 to 2 weight % of a rheology modifier by weight of the sealing layer excluding solvents. The rheology modifier increases the storage stability of the aqueous polymer composition that is used to form the sealing layer. It also facilitates film formation, improve sealing stability, and provide other functions. Non-limiting examples of rheology modifiers include associative thickeners, alkali swellable acrylic emulsions, and other polymeric thickeners. The aqueous polymer composition may be shear thinning, that is to say, its viscosity is reduced at higher shear. For example, the rheology profile of the aqueous polymer composition may shows a reduction of the viscosity between viscosity at shear rate of $10^{-4}$ l/s and the viscosity at shear rate of $10^2$ l/s by 5 times to 10,000 times.

The sealing layer may also comprise a wetting agent, also called surfactant. Examples of wetting agents include FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn. Wetting agents may increase the affinity between the sealing layer and the microcells, enhance the interfacial area between them, and improve the adhesion of the sealing layer to the microcells and provide a more flexible coating process.

The sealing layer may also comprise from 1 to 45 weight % of a filler by weight of the sealing layer excluding solvents. The filler may be a conductive filler. The filler of the sealing layer may be selected from the group consisting of carbon black, graphene, graphite, and carbon nanotubes. The filler decreases the volume resistivity of the sealing layer, but it may also affect other properties of the layer such as its surface energy. In order to be effective as a filler, carbon black must have excellent dispersibility in the aqueous polymer composition. The aqueous polymer composition, and the corresponding sealing layer, may comprise from 1 to 45 weight %, or from 5 to 45 weight %, or from 10 to 45 weight %, or from 15 to 40 weight %, or from 17 to 38 weight %, or from 18 to 36 weight %, or from 15 to 36 weight %, or from 18 to 36 weight %, or from 20 to 36 weight % of a filler by weight of the aqueous polymer composition excluding solvents.

It was observed by the inventors of the present invention that an important aspect that enables excellent electro-optic performance, especially at low temperatures, is the surface energy of the sealing layer. Total surface energy of the sealing layer must be above 55 mN/m. The total surface energy of the sealing layer may be from 55 to 80 mN/m, or from 55 to 70 mN/m. The dispersive component of the surface energy may be higher than 40 mN/m. The dispersive component of the surface energy of the sealing layer may be higher than 41 mN/m, or higher than 43 mN/m. The dispersive component of the surface energy of the sealing layer may be from 40 to 60 mN/m, or from 40 to 50 mN/m, or from 40 to 45 mN/m.

The high surface energy of the sealing layer can be achieved by the selection of the components of the aqueous polymer composition that forms the sealing layer. For example, the conductive filler may have total surface energy higher than 40 mN/m, or higher than 45 mN/m, or higher than 50 mN/m. The dispersive component of the conductive filler may be higher than 15 mN/m, or higher than 20 mN/m. The conductive filler may have total surface energy from 40 to 80 mN/m, or from 40 to 70 mN/m, or from 40 to 65 mN/m. or from 40 to 60 mN/m. The dispersive component of the conductive filler may be from 15 to 40 mN/m, or from 15 to 30 mN/m, or from 15 to 25 mN/m. The high surface energy of the sealing layer may also achieved by selecting a polyurethane having high surface energy. For example, the polyurethane of the sealing layer may have total surface energy higher than 50 mN/m. The dispersive component of the polyurethane may be higher than 40 mN/m. The polyurethane may have total surface energy higher than 45 mN/m, or higher than 50 mN/m, or higher than 55 mN/m. The polyurethane may have total surface energy from 45 to 75 mN/m, or from 45 to 70 mN/m, or from 45 to 65 mN/m, or from 50 to 75 mN/m, or from 50 to 70 mN/m, or from 50 to 65 mN/m. The dispersive component of the polyurethane may be from 40 to 70 mN/m, or from 40 to 50 mN/m.

The inventors of the present invention found that the oil adsorption value of the carbon black used in the sealing layer is preferably 100 mL or less per 100 mg of carbon black. Electro-optic displays having a sealing layer comprising carbon black filler with OAN less than 100 mL per 100 mg of carbon black show improved resolution, as shown in Table 10 below. The oil absorption number of the carbon black of the sealing layer may be less than 95 mL per 100 mg of carbon black, or less than 90 mL per 100 mg of carbon black, or less than 85 mL per 100 mg of carbon black, or less than 80 mL per 100 mg of carbon black, or less than 70 mL per 100 mg of carbon black, or less than 60 mL per 100 mg of carbon black, or less than 50 mL per 100 mg of carbon black.

The oil absorption number of the carbon black of the sealing layer may be from 30 mL to 100 mL per 100 mg of carbon black, or from 40 mL to 100 mL per 100 mg of carbon black, or from 45 mL to 100 mL per 100 mg of carbon black, or from 50 mL to 100 mL per 100 mg of carbon black, or from 40 mL to 95 mL per 100 mg of carbon black, or from 45 mL to 95 mL per 100 mg of carbon black, or from 50 mL to 95 mL per 100 mg of carbon black, or from 55 mL to 95 mL per 100 mg of carbon black, or from 40 mL to 90 mL per 100 mg of carbon black, or from 45 mL to 90 mL per 100 mg of carbon black, or from 50 mL to 90 mL per 100 mg of carbon black, or from 40 mL to 80 mL per 100 mg of carbon black, or from 45 mL to 80 mL per 100 mg of carbon black, or from 50 mL to 80 mL per 100 mg of carbon black, or from 55 mL to 80 mL per 100 mg of carbon black.

The oil absorption number is typically reported by carbon black manufacturers as OAN, measured using the method according to ASTM 2414. It represents the degree of structure and aggregation of the carbon black particles. That is, the larger the OAN, the higher the structure of the carbon black particles (connected with each other and having branched structures) and/or the higher the degree of aggregation of the particles. More structured/aggregated carbon black may generally provide higher conductivity to the sealing layer.

Another conclusion of the experimental work disclosed herein is that the carbon black filler of the sealing layer has preferably average particle size larger than 20 nm. Thus, Carbon blacks having very small average particle sizes are difficult to disperse and will result in sealing layers with inferior properties. The average particle size of the carbon black filler of the sealing layer may be larger than 30 nm, or larger than 40 nm, or larger than 50 nm, or larger than 60 nm, or larger than 80 nm, or larger than 100 nm. The average particle size of the carbon black filler of the sealing layer may be from 31 to 150 nm, or from 40 to 150 nm, or from 50 to 150 nm, or from 60 to 150 nm, or from 80 to 150 nm, or from 100 to 150 nm, or from 31 to 100 nm, or from 40 to 100 nm, or from 50 to 100 nm. Average particle size is another physical property of carbon black grades that are reported by carbon black manufacturers. Average particle size corresponds to average particles diameter that are typically determined by transmission electron microscopy (TEM) using the ASTM method D3849.

As will be seen in Table 7 of the Examples Section, improved results in terms of the dispersion quality of carbon black were achieved by using carbon black filler that have specific surface area less than 90 m$^2$/g. The carbon black of the sealing layer may have specific surface area of less than 85 m$^2$/g, or less than 80 m$^2$/g, or less than 75 m$^2$/g, or less than 70 m$^2$/g, or less than 60 m$^2$/g, or less than 50 m$^2$/g, or less than 40 m$^2$/g. The carbon black of the sealing layer may have specific surface area from 20 to 89 m$^2$/g, or from 30 to 89 m$^2$/g, or from 35 to 89 m$^2$/g, or from 40 to 89 m$^2$/g, or from 50 to 89 m$^2$/g, or from 20 to 88 m$^2$/g, or from 30 to 88 m$^2$/g, or from 35 to 88 m$^2$/g, or from 40 to 88 m$^2$/g, or from 50 to 88 m$^2$/g, or from 20 to 85 m$^2$/g, or from 30 to 85 m$^2$/g, or from 35 to 85 m$^2$/g, or from 40 to 85 m$^2$/g, or from 50 to 85 m$^2$/g, or from 20 to 80 m$^2$/g or from 30 to 80 m$^2$/g, or from 35 to 80 m$^2$/g, or from 40 to 80 m$^2$/g, or from 50 to 80 m$^2$/g, or from 20 to 70 m$^2$/g, or from 30 to 70 m$^2$/g, or from 35 to 70 m$^2$/g, or from 40 to 70 m$^2$/g, or from 50 to 70 m$^2$/g, or from 20 to 65 m$^2$/g, or from 30 to 65 m$^2$/g, or from 35 to 65 m$^2$/g, or from 40 to 65 m$^2$/g, or from 50 to 65 m$^2$/g. Carbon blacks having specific surface area of 90 m$^2$/g and larger show poor dispersion quality, which will result in inferior aqueous polymer composition and sealing layer with inferior properties. However, the inventors of the present invention also found that carbon black products that have higher volatile content can be dispersed easier than carbon black products having lower volatile contents, even if they exhibit high specific surface area. Relevant results are shown in Table 7. That is, the carbon black of the sealing composition of the present invention may have specific surface area less than 200 m²/g and volatile content higher than 4.5%. The carbon black of the sealing composition of the present invention may have specific surface area less than 200 m²/g and volatile content higher than 5%. The carbon black of the sealing composition of the present invention may have specific surface area less than 190 m²/g, or less than 180 m²/g, or less than 170 m²/g, and volatile content higher than 5%, or higher than 7%, or higher than 8%, or higher than 9%, or higher than 10%, or higher than 12%. The carbon black of the sealing composition of the present invention may have specific surface area of from 30 to 195 m²/g or from 40 to 195 m²/g, or from 50 to 195 m²/g, or from 60 to 195 m²/g, or from 30 to 190 m²/g or from 40 to 190 m²/g, or from 50 to 190 m²/g, or from 60 to 190 m²/g, or from 30 to 180 m²/g or from 40 to 180 m²/g, or from 50 to 180 m²/g, or from 60 to 180 m²/g, or from 100 to 195 m²/g or from 100 to 190 m²/g, or from 150 to 195 m²/g, and volatile content from 5.1 to 25%, or from 5.1 to 20%, or from 5.1 to 15%, or from 7 to 25%, or from 7 to 10%, or from 7 to 15%, or from 10 to 25% or from 10 to 20%, or from 10 to 15%. Specific surface are is a physical property that is routinely reported by carbon black manufacturers. It is measured using the nitrogen adsorption method according to ASTM D6556. It represents the surface area of carbon black particles per weight unit (per gram). Volatile content of carbon blacks is a property that is typically reported by carbon black manufacturers. It corresponds to the content of the product in oxygen-containing species, such as species that comprise carbonyl, carboxylic acid, pyrone, phenol, quinone, lactol, ether, lactone, etc. These species are bound to the surface of the carbon black particles and cannot be typically removed by common extraction techniques. They are formed by certain conditions during the formation of the carbon black material or by oxidative post-treatment, such as, for example ozonation. The volatile content of carbon black is measured as a weight percent of the materials that are removed from the product after heating at 950° C. The method titled "Testing of Carbon Black; Determination of the Amount of Components of Carbon Black that are Volatile on Heating" is described in DIN 53552. The volatile content does not include moisture or solvent content that may be present in the particles.

In general, the sealing layer of an electrophoretic display plays an important role in the display performance. Inferior barrier property of a sealing layer results in non-polar fluid of the electrophoretic medium escaping from the electro-optic material layer over time, which leads to a severe deteriorating the electro-optic performance of the display. It was observed that increasing the content of poly(vinyl alcohol) homopolymer or poly(vinyl alcohol-co-ethylene) copolymer of the sealing layer improves its barrier properties. However, sealing layers having high content of poly (vinyl alcohol) homopolymer or poly(vinyl alcohol-co-ethylene) copolymer increase its moisture absorption, which is also undesirable. The interfacial tension between the poly (vinyl alcohol) polymer or poly(vinyl alcohol-co-ethylene) copolymer and the polyurethane may be less than 2 mN/m.

These and other aspects of the present invention will be further appreciated upon consideration of the following Examples, which are intended to illustrate certain particular embodiments of the invention but are not intended to limit its scope, as defined by the claims.

EXAMPLES

Methods of Evaluation of Sealing Layers
A. Example of Preparation of the Aqueous Polymer Compositions that Form Sealing Layers.

A1. Example of preparation of carbon black dispersion. The carbon black powder is mixed with a 1.6-liter aqueous solution of the poly(vinyl alcohol) homopolymer or the poly(vinyl alcohol-co-ethylene) copolymer. In one example, 162 g of carbon black and 105.6 g of the polymer were used. The dispersion was mixed in an overhead mixer (Hei-Torque Value 200) for 30 minutes at 300 rpm. The dispersion was then recirculated in a Generation 1 Q1375 Flocell Sonicator, wherein the jacket of the sonicator is cooled using chilled water of 10° C. and at 100% amplitude for 3 hours and 23 minutes. The dispersion was continuously stirred until it was used to prepare the aqueous polymer composition.

A2. Example of preparation of aqueous polymer composition. Into a container, an aqueous polyurethane dispersion were combined with a wetting agent, and an aqueous solution of poly(vinyl alcohol) homopolymer or poly(vinyl alcohol-co-ethylene) copolymer, comprising approximately 20 weight % of the homopolymer or copolymer. In one example, 194 g of 35 weight % polyurethane aqueous dispersion and 372 g of a 20 weight % of poly(vinyl alcohol) homopolymer or poly(vinyl alcohol-co-ethylene) copolymer were used. The dispersion was mixed for 10 minutes at 90 rpm using a Hei-torque Value 200 overhead mixer. Then, the appropriate amount of a crosslinker was added, and the dispersion was mixed for an additional 60 minutes at 90 rpm. The appropriate amount of the carbon black dispersion prepared in A1 was added (in one example 1.39 L) and the mixture was mixed for 60 minutes at 500 rpm. The pH was then adjusted to 6.5-8.5 using ammonium hydroxide and the dispersion was mixed for an additional 30 minutes. The appropriate amount of a rheology modifier was added into the dispersion dropwise and the mixing continued for another 60 minutes. Then, the dispersion was degassed under reduced pressure (25 mmHg) for 5 days. The resulting aqueous polymer composition was used for the preparation of a sealing layer of the corresponding device within 7 days of the preparation of the aqueous polymer composition.
B. Example of Preparation of Sealing Layer Using a Drawdown Method.

The aqueous polymer composition prepared in A2 above was coated on the Indium-Tin Oxide (ITO) side of an ITO-PET film using a Gradco drawdown coater. A 15-mil gap and an eight path square applicator was used. The drawdown speed was set at 2 m/min to target a dry film thickness of 30+/−2 μm. The coating was dried at a 100° C. oven for 15 minutes. The dried film was conditioned at 25° C. and 55% relative humidity for 24 hours.
C. Evaluation of Barrier Property of Sealing Layers Towards Non-Polar Fluids.

Figure 8A:
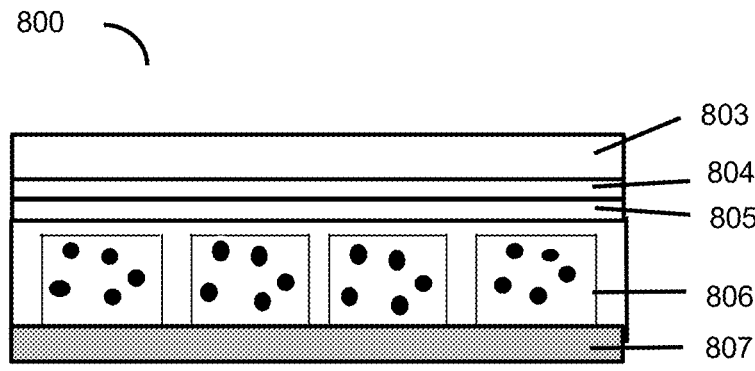
FIGS. 8A and 8B illustrates the structure of the electro-optic device that were used for the evaluation of sealing layer examples for barrier properties and electro-optic performance respectively.
Figure 10A:
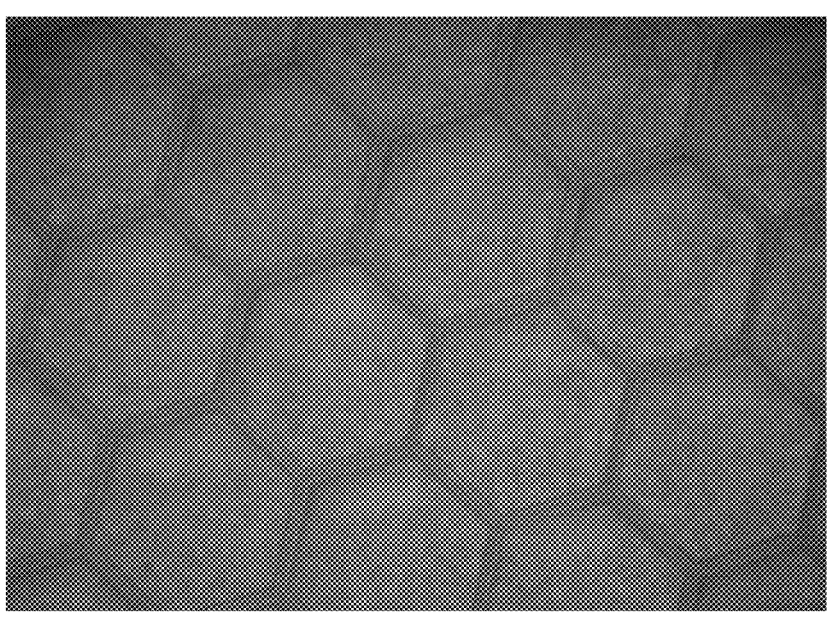
FIGS. 10A-10D show microscope images of microcells evaluated for barrier properties.
Figure 10B:
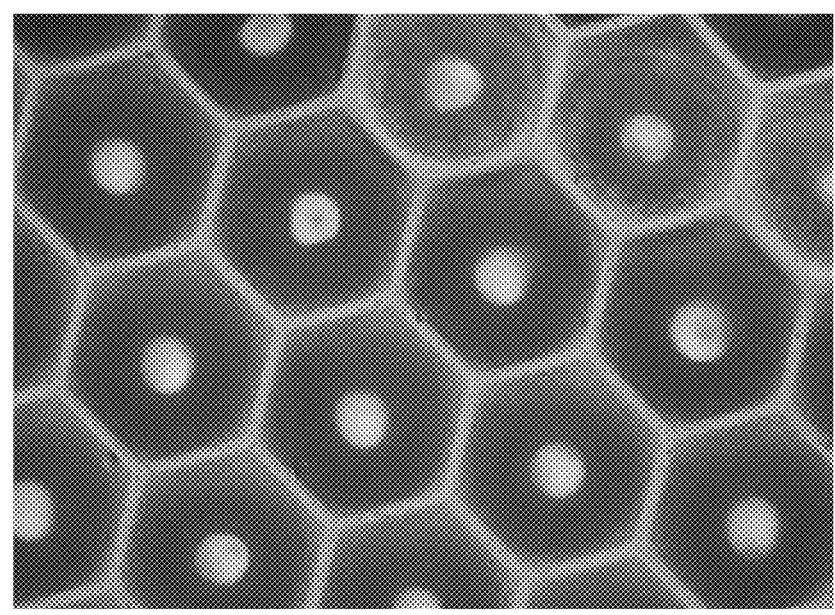
Figure 10C:
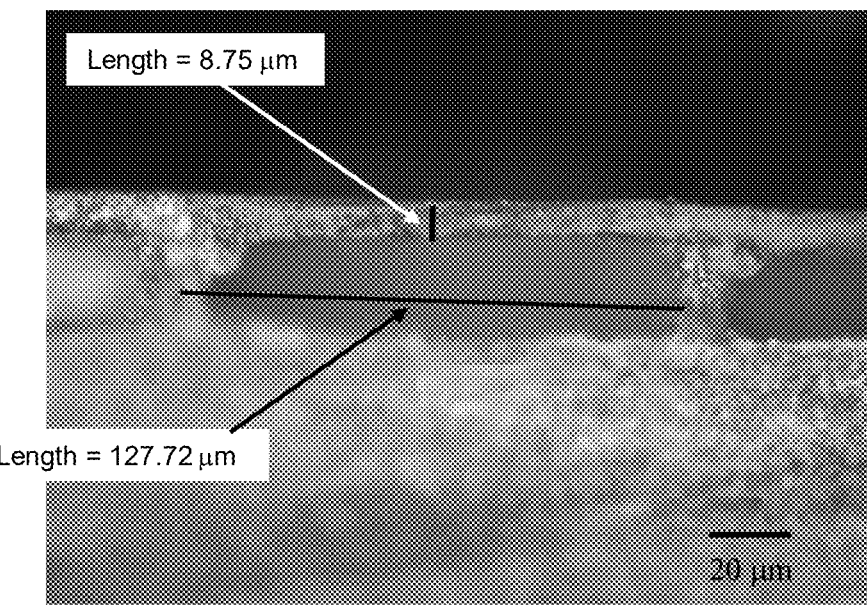
Figure 10D:
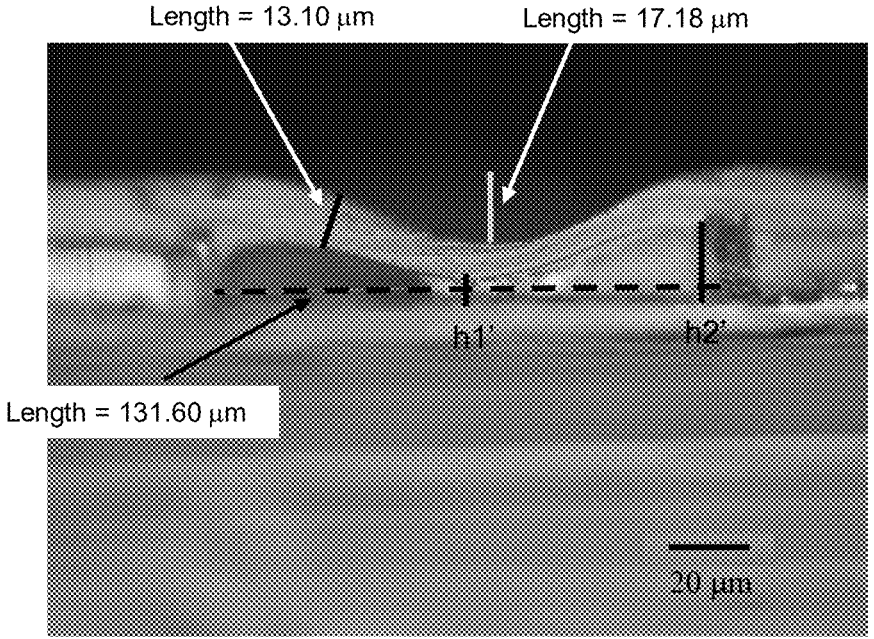

An aqueous dispersion was prepared by mixing 10 grams of poly(vinyl alcohol) homopolymer or 10 grams of poly (vinyl alcohol-co-ethylene) copolymer and 10 grams of polyurethane in 100 mL of water. The dispersion was used as an aqueous polymer composition to form a sealing layer of device 800 illustrated in FIG. 8A. The sealing layer was formed by the method described in B above. Device 800 comprised in order: substrate 803, light-transmissive conductive layer 804, primer layer 805, microcell layer 806, and sealing layer 807. The microcell included an electrophoretic medium comprising white, black, and red pigment particles in Isopar E. Device 800 was stored at 70° C. for at least 24 hours. After this period, the electro-optic device was inspected using an optical microscopy for sagging of the sealing layer caused by the loss of the non-polar fluid of the electrophoretic medium. If the distance between the bottom of the inspected microcavity and the lowest point of the bottom surface of the sealing layer is less than 85% of the distance between the bottom of the microcavity and the highest point of the lower surface of the sealing layer at the same microcell, the sealing layer is labeled as FAIL for its barrier property. Otherwise, that is, if the distance between the bottom of the inspected microcell and the lowest point of the sealing layer is 85% or more of the distance between the bottom of the microcell and the highest point of the bottom surface of the sealing layer at the inspected microcell, the sealing layer is labeled as PASS for its barrier property. For example, the sealing layer that was used to prepare the electro-optic device illustrated in FIG. 10C was labeled as PASS because the ratio of h2:h1 is 1 (no sagging), whereas the sealing layer that was used to prepared the electro-optic device illustrated in FIG. 10D was labeled as FAIL because the ratio of h2:h1 is 35% (sagging level of more than 85%). The barrier property evaluation may also be performed qualitatively by observing the prepared electro-optic device by an optical microscopy looking from the viewing surface of the device. Devices that comprise severely sagged sealing layers have significantly different appearance from devices that comprise sealing layers with good barrier property towards non-polar fluids (non-uniform versus uniform surface). For example, microcells having the sealing layer of FIG. 10C (PASS) appears uniform as shown in FIG. 10A, as opposed to microcells having the sealing layer of FIG. 10D (FAIL), which appears non-uniform as shown in FIG. 10B. The evaluation of various combinations of (1) poly(vinyl alcohol) homopolymer or Poly(vinyl alcohol-co-ethylene) copolymer and (2) polyurethane are shown in Table 1. Polymer 1 is poly(vinyl alcohol) homopolymer or poly (vinyl alcohol-co-ethylene) copolymer, and Polymer 2 is Polyurethane. Details on the commercial material of Polymer 1 and Polymer 2 can be found in Table 2.

D. Determination of the Surface Energy of Sealing Layer Using the Contact Angle Method.

The surface energy of the prepared sealing layers (as described in B above) were measured using a Drop Shape Analyzer supplied by Kruss GmbH. Using a syringe with a needle, a 2.6 μL size droplet of deionized water was placed on the top surface of the sealing layer and the contact angle between the liquid (water) and the sealing layer was measured. The measurement was repeated by replacing the water droplet with a diiodomethane droplet. By performing contact measurements using these two liquids of known surface energy, the surface energy of the film was calculated. The contact angle measurement was repeated three times for each liquid (water and diiodomethane). The contact angle between the liquid and the top surface of the sealing layer was measured using the high resolution camera after 5 s, 30 s, and 55 s from the time that the droplet was placed on the sample film. Then, using the Owens, Wendt, Rabel and Kaelble (OWRK) method, the total surface energy and its polar and dispersive components were calculated for each data point. The reported surface energies were averages of 9 data points (3 droplets×3 time scales).

E. Determination of the Surface Energy of a Polyurethane Film Using the Contact Angle Method.

The surface energy of a polyurethane was determined by first preparing a polymer film on a substrate. The polymer film was prepared by coating an aqueous polyurethane dispersion on the substrate using a Gradco drawdown coater. A 15-mil gap and an eight path square applicator was used. The drawdown speed was set at 2 m/min to target a dry film thickness of 30+/−2 μm. The coating was dried at a 100° C. oven for 15 minutes. The dried film was conditioned at 25° C. and 55% relative humidity for 24 hours. Then, the method described in D above was used to determine the contact angles of two different liquids (water and diiodomethane) and to calculate the total surface energy and its polar and dispersive components of the polymer film using the OWRK model.

F. Preparation for the Electro-Optic Device.

Figure 8B:
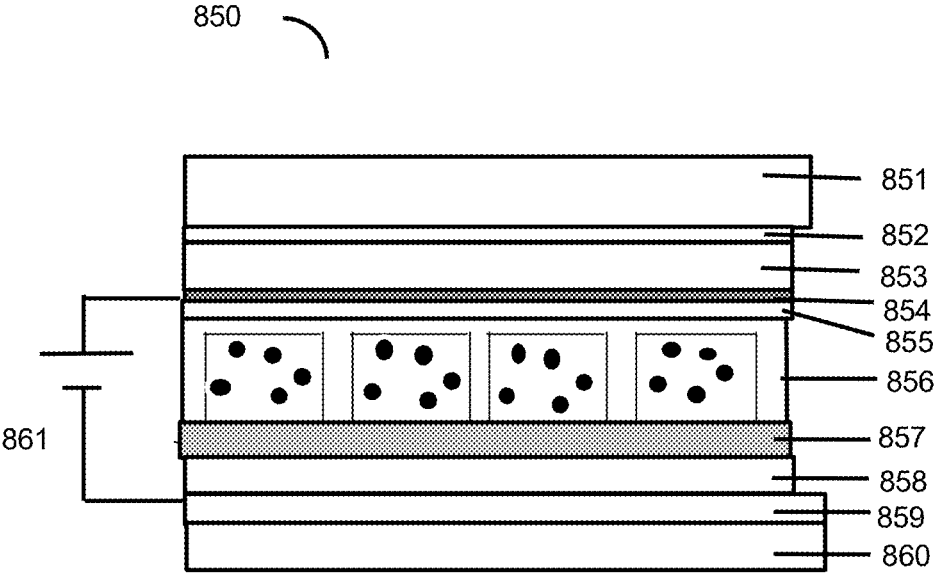

An electro-optic device was prepared by filling a plurality of microcells with a mixture of electrically charged pigment particles (white, black, and red) in Isopar E, followed by coating of aqueous polymer composition as described in B above. The device illustrated in FIG. 8B was constructed. Electro-optic device 850 comprised in order protective film 851, first adhesive layer 852 that was optically clear, substrate 853, light-transmissive conductive layer 854, primer layer 855, microcell layer 856, sealing layer 857, second adhesive layer 858, ITO electrode layer 859, and Glass layer 860. A source of electric field 861 electrically connected light-transmissive conductive layer 854 with ITO electrode layer 859. Waveforms were applied through this source to drive the desired optical state. First light-transmissive layer 852 had approximate thickness of 25 μm. Substrate 853 had approximate thickness of 100 μm. Primary layer 855 had approximate thickness of 0.4 μm. Microcell layer 856 comprised a plurality of microcells. Each microcell had an approximate bottom thickness of 0.4 μm and approximate height of 14 μm. Sealing layer 857 had approximate thickness of 10 μm and the second adhesive layer had approximate thickness of 6 μm.

G. Red Color Ra* Measurements.

Figure 9A:
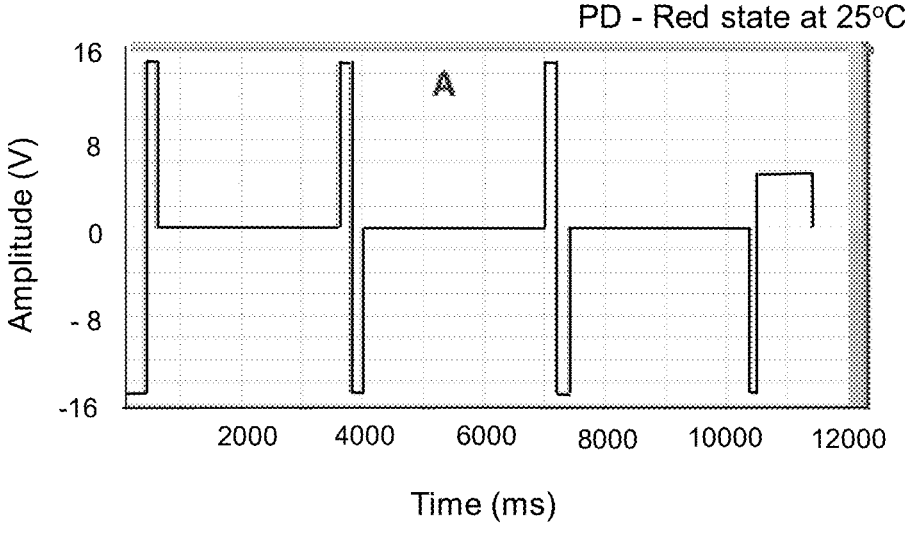
FIGS. 9A-9F illustrate the waveforms that were used to evaluate the electro-optic performance of the devices of the examples.
Figure 9B:
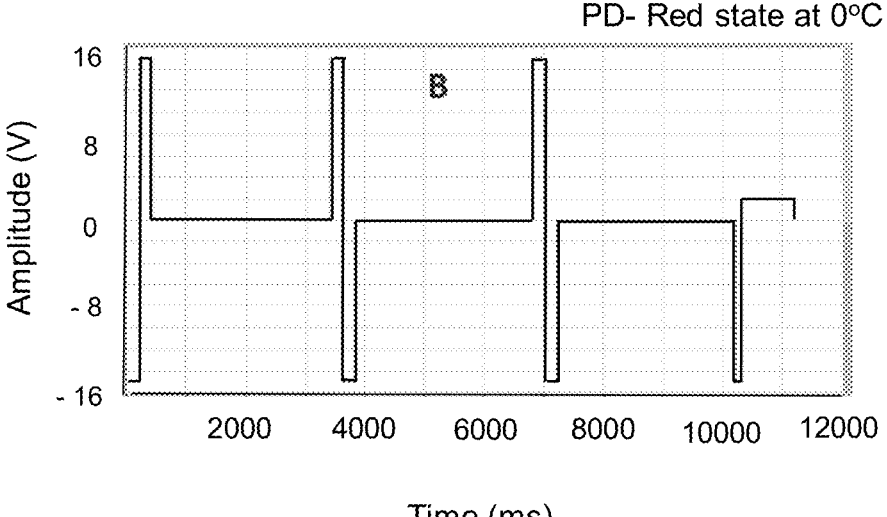
Figure 9C:
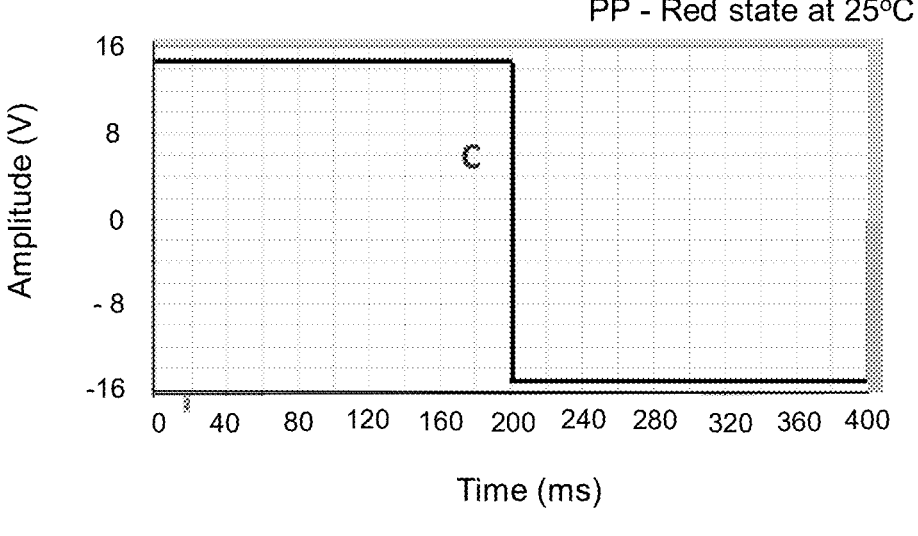
Figure 9D:
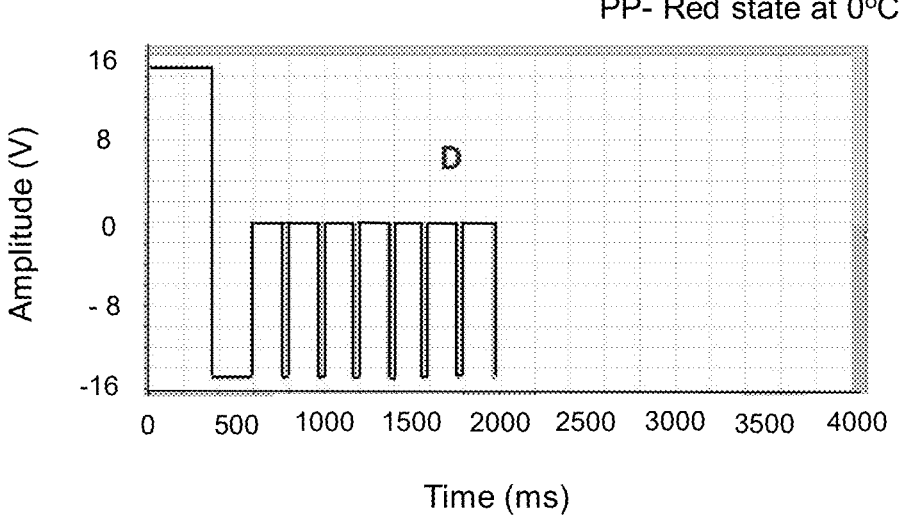
Figure 9E:
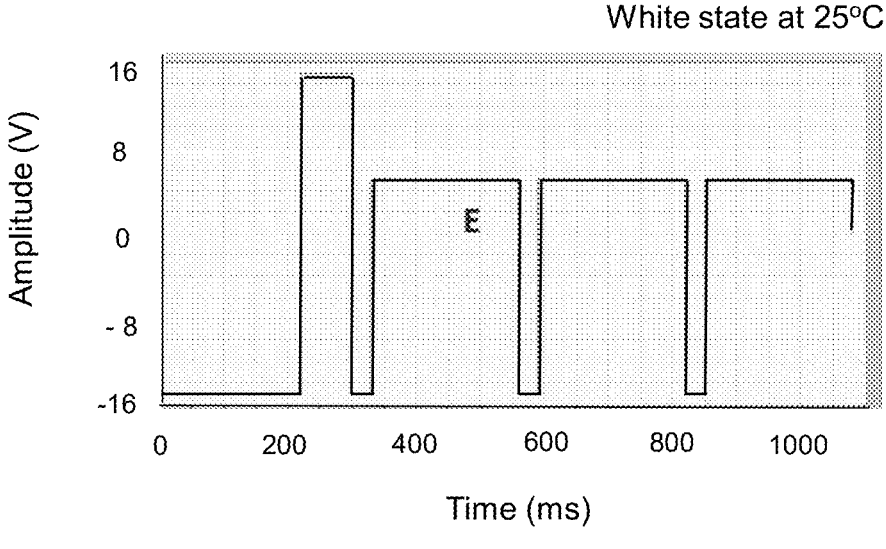
Figure 9F:
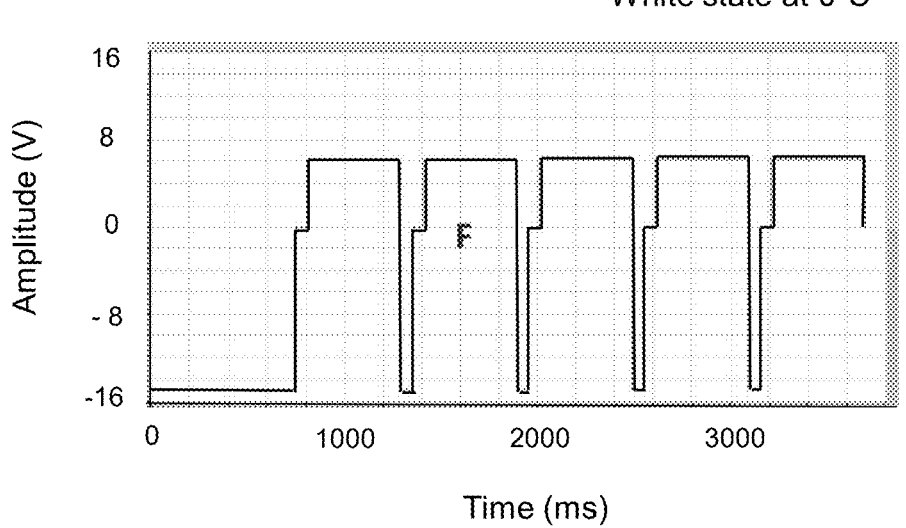

The electro-optic performance of the sample devices prepared in E above were evaluated by collecting color data. Color data were collected by applying two different waveforms, a short waveform PD and a long waveform PP, to drive the desired red color state at two different temperatures. Furthermore, waveforms were applied to drive the white state at two different temperatures. The applied waveforms are shown in FIGS. 9A to 9F. FIG. 9A corresponds to PD waveform to drive the red state at 25° C. FIG. 9B corresponds to PD waveform to drive the red state at 0° C. FIG. 9C corresponds to PP waveform to drive the red state at 25° C. FIG. 9D corresponds to PP waveform to drive the red state at 0° C. FIG. 9E corresponds to waveform to drive the white state at 25° C. FIG. 9F corresponds to waveform to drive the white state at 0° C. The waveforms were applied in a wide range of voltages to measure Red color a* as function of the applied waveform. Spectrophotometer i1, supplied by x-rite, was used to measure the color state of the derived image on the device sample and reported as Red a*. The color performance is evaluated as Red a* value. Higher value of a* means better red color (more saturated red).

H. Determination of Voltage Required for Maximum a* of the Red State.

In addition to the color value of each display, a series of experiments were performed to determine the voltage required to produce the maximum a*. Specifically, the applied voltage of each waveform was varied and the a* value for each voltage value was determined as using the method F above. The voltage that produced the highest a* value was reported for each waveform. Typically, smaller voltage is desirable, because high applied voltages increase the power consumption.

I. Determination of Interfacial Tension.

The interfacial tension between Polymer 1 and Polymer 2 for the specific combinations of polymers was calculated from surface energy values (determined via the method described in D above). The calculation of the interfacial tension between the two ingredients was performed by using the values for the surface energy of each ingredient and the following geometric equation:

$$\sigma_{AB} = \sigma_A + \sigma_B - 2\left(\sqrt{\sigma_A{}^D \cdot \sigma_B{}^D} + \sqrt{\sigma_A{}^P \cdot \sigma_B{}^P}\right)$$

where $\sigma_{AB}$ is the interfacial tension between polymer A and B; $\sigma_A$ is the total surface energy of polymer A; $\sigma_B$ is the total surface energy of polymer B; $\sigma_A{}^D$ and; $\sigma_B{}^D$ is dispersive component of the surface energy of polymer A and B, respectively; $\sigma_A{}^D$ and $\sigma_B{}^D$ are polar component of surface energy of polymer A and B, respectively.

J. Method of Evaluation of Carbon Black Dispersibility

Carbon black dispersion using various carbon black samples were prepared using the method described in A1 above. The polymer used in the dispersion was poly(vinyl alcohol-co-ethylene) copolymer (Exceval™ RS-1717, supplied by Kuraray). After the preparation of the carbon black dispersion, a droplet of the carbon black dispersion was placed between a microscopic glass slide and a cover plate. The sample was examined under a light microscope at 20× magnification. The corresponding image corresponding to an area of 140 μm×140 μm was visually analyzed for the number of aggregates having a diameter size of 7 μm and larger. If the sample showed 10 or more aggregate particles having a diameter size of 7 μm and larger, the sample was labeled FAIL for dispersibility. Otherwise, it was labeled PASS for dispersibility.

L. Method of Evaluation of Volume Resistivity of the Sealing Layer.

The volume resistivity of a sealing layer prepared using the method described in B above was determined using Model 8009 Resistivity Fixture and Model 6571 Electrometer supplied by Keithley. This equipment allows the user to determination of the volume resistivity of a free-standing film by applying an alternating voltage to the substrate and measuring the output electric current. From the voltage and the current, the electrical resistance of the sample was calculated. The method includes the cutting of a 4 inch×4 inch square section of the sealing layer and the pealing of the section from the ITO-PET substrate to obtain a free-standing sealing film. The thickness of the measured with a thickness gauge, and then the film was placed for conditioning in an environmental chamber at 25° C. and 55% relative humidity for 4 days. The film was then placed within the Resistivity Fixture Model 8009 and tested at a setting of 15 Volts at 15 seconds. The Electrometer provides the volume resistivity value.

M. Method of Evaluation of the Resolution of the Display Image.

The resolution of electrophoretic displays, prepared by the method described in E above, was evaluated by measuring the thickness of an actual line of a color on the display, wherein the line is the result of the pixel controller's command to form a line with a 1-pixel width (at 50° C.). The measured thickness was then compared with the thickness of a standard 1-pixel line without blooming. Resolution of 100% corresponds to highest resolution without blooming and resolution of 0% corresponds to the actual line being twice as thick as the standard line.

K. Method of Evaluation of Viscosity Profile of an Aqueous Polymer Composition.

Figure 11:
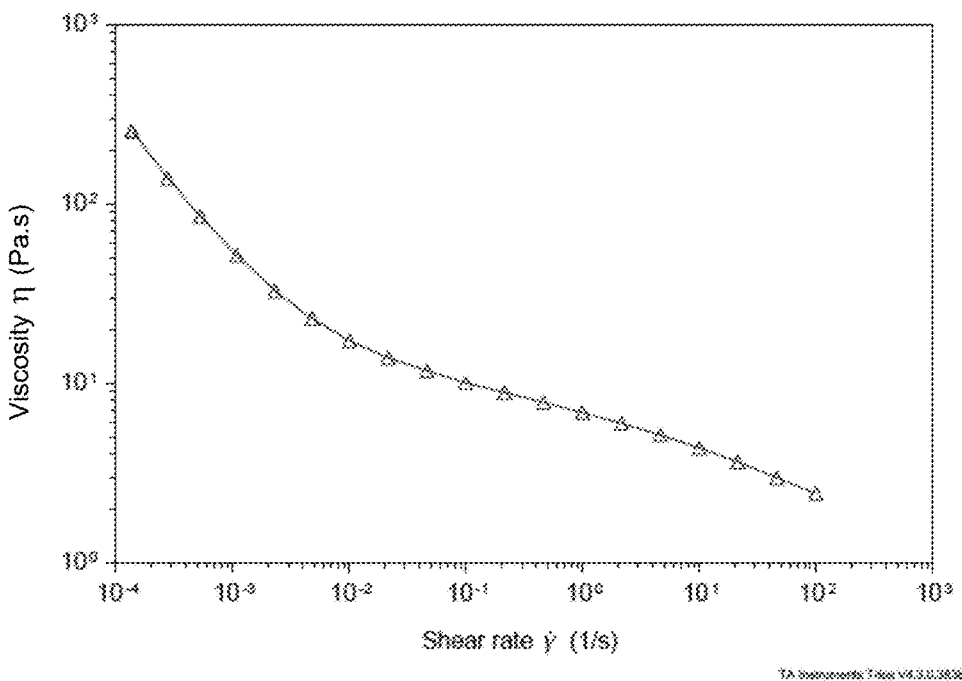
FIG. 11 shows the viscosity profile of an aqueous polymer composition at various shear rates.

The viscosity profile of an aqueous polymer composition, prepared as described in A2 above, was performed by a rotation TA Instruments rheometer equipped with parallel plates having a diameter of 40 mm and at a gap of 50 μm. The aqueous polymer composition sample was placed between the parallel plates and the viscosity was measured at a series of shear rates between the values of $10^{-3}$ 1/s and $10^2$ 1/s over a period of 30 minutes. The viscosity profile of an example of an aqueous polymer composition of the present invention is illustrated in FIG. 11. FIG. 11 shows that the evaluated aqueous polymer composition is shear thinning, exhibiting reduction of the viscosity at higher shear rates compared to the viscosity at lower shear rate. Specifically, the viscosity of the aqueous polymer composition evaluated in FIG. 11 at shear rate of $10^{-3}$ 1/s is more than 10 times larger than the viscosity at shear rate at $10^2$ 1/s.

O. Method of Evaluation of Total Surface Energy and Dispersive Component of the Surface Energy of the Conductive Filler.

A glass tube with a porous base was filled with the powder conductive filler. The glass tube was placed on top of a container containing hexane as a test liquid. The hexane was drawn up the glass tube through capillary action. The glass tube was attached on a force sensor that measured the change in mass over time as the liquid moved up the glass tube and wetted the filler surface. By taking the slope of this measurement and known properties of the hexane test liquid, the equation below can ultimately be used to calculate the contact angle of the conductive filler.

$$\frac{m^2}{t} = \frac{c * \rho^2 * \sigma * \cos(\theta)}{\eta}$$

In the equation, m is the mass of the filler, t is time, c is a constant, $\rho$ is the density of the test liquid, $\sigma$ is the surface tension of the test liquid, $\theta$ is the contact angle, and $\eta$ is the viscosity of the test liquid. Using hexane as the test liquid allows $\theta$ to become zero due to its high wettability properties, allowing the software of the instrument to calculate the constant c. Additional known liquids are then used to measure contact angles that the software can use to calculate the surface energy of the filler. The surface energy calculation was performed by using the Owens, Wendt, Rabel and Kaelble (OWRK) model to determine the total surface energy as well as the polar and dispersive components of the filler.

Evaluation Results

Unless otherwise stated, the amounts of the ingredients in the disclosed compositions are in dry basis (not including solvents). The term Q.S. (quantum satis) is used in some compositions to represent the content of the carrier. It means that the content of this ingredient in the composition is as much as is needed to achieve the total 100% of the composition, and not more.

A number of aqueous polymer compositions were prepared by the general method described in A1 and A2 above. The weight ratio of poly(vinyl alcohol) homopolymer or poly(vinyl alcohol-co-ethylene) copolymer to polyurethane was 2.3, and the amount of the aqueous carrier in the aqueous polymer composition was 80 to 83 weight %. The content the crosslinker was 0.90 weight %, whereas the content of the wetting agent (Silwet L-7607) was 0.19 weight % by weight of the aqueous polymer composition excluding solvents. Furthermore, the aqueous polymer composition also contained 0.22 weight % of a rheology modifier (modified alkali swellable acrylic emulsions (Solthix A100 supplied by Lubrizol) by weight of the aqueous polymer composition excluding solvents. The content of carbon black in the aqueous polymer was adjusted to achieve a sealing layer having volume resistivity in the range of $10^8$ to $10^{10}$ Ohm·cm, typically from 3.6 to 6 weight % by weight of the aqueous polymer composition excluding solvents. The variety of the prepared aqueous polymer Sealing layer compositions are summarized in Table 1. Sealing layers were prepared from these aqueous polymer compositions using the method described in B above. The sealing layers were then evaluated for the total surface energy and the dispersive component of the surface energy by the method described in D above. Separately, the total surface energy and the dispersive component of corresponding control films prepared from each polyurethane used in the aqueous polymer compositions using the method described in E above. These polyurethane control films do not contain a poly(vinyl alcohol) homopolymer or a poly (vinyl alcohol-co-ethylene) copolymer or carbon black. Finally, the total surface energy and the dispersive component of the surface energy of two of the carbon black grades were measured using the method described in O above.

Electrophoretic displays were constructed from various composition using the method described in F above. The electrophoretic displays were driven to the red state using two different waveforms at 0° C. as described in the method described in G above. Finally, the voltage required for producing the highest a* value of the red state for each waveform was determined using the method described in H above.

TABLE 1

Surface Energy Properties of Sealing Layers of Various Compositions, Electro-Optic Properties of the Corresponding Devices

| Ingredients | Ex. 1 | Ex. 2 | Ex. 3 |
|---|---|---|---|
| Poly(vinyl alcohol-co-ethylene) copolymer | RS-1717 [1] | RS-1717 [1] | RS-1717 [1] |
| Polyurethane | | Polyurethane L3838 [2] | Polyurethane L3838 [2] |
| | Polyurethane HD2125 [3] | | |
| Carbon Black | Carbon Black Raven ® 1060 UP [5] | Carbon Black Raven ® 1060 UP [5] | |
| | | | Carbon Black Nerox ® 3500 [6] |
| Sealing layer dispersive component of the surface energy (mN/m) | 43 | 41 | 43 |
| Sealing layer total surface energy (mN/m) | 66 | 66 | 66 |
| Voltage for maximum red a* at 0° C.; PP Waveform (Volts) | 4.4 | 4.8 | 4.8 |
| Red color a* at 0° C.; PP Waveform | 35 | 34 | 33 |
| Voltage for maximum red a* at 0° C.; PD Waveform (Volts) | 5 | 5.6 | 5.6 |
| Red color a* at 0° C.; PD Waveform | 27 | 25 | 25 |
| Polyurethane dispersive component of the surface energy (mN/m) | 48 | 47 | 47 |
| Polyurethane Total surface energy (mN/m) | 62 | 58 | 58 |
| Carbon Black dispersive component of the surface energy (mN/m) | 24 | 24 | |
| Carbon Black Total surface energy (mN/m) | 64 | 64 | |

| Ingredients | Ex. 4 | Ex. 5 | Comparative Ex. 6 |
|---|---|---|---|
| Poly(vinyl alcohol-co-ethylene) copolymer | RS-1717 [1] | RS-1717 [1] | RS-1717 [1] |
| Polyurethane | Polyurethane L3838 [2] | Polyurethane L3838 [2] | |
| | | | Polyurethane 386-03 [4] |
| Carbon Black | Carbon Black Nerox ® 2500 [7] | | |
| | | Carbon Black TPK1227R [8] | |
| | | | Carbon Black Raven ® 14 [9] |

TABLE 1-continued

| Surface Energy Properties of Sealing Layers of Various Compositions, Electro-Optic Properties of the Corresponding Devices | | | |
|---|---|---|---|
| Sealing layer dispersive component of the surface energy (mN/m) | 43 | 42 | 38 |
| Sealing layer total surface energy (mN/m) | 65 | 66 | 53 |
| Voltage for maximum red a* at 0° C.; PP Waveform (Volts) | 5.2 | 4.8 | 9 |
| Red color a* at 0° C.; PP Waveform | 31 | 31 | 24 |
| Voltage for maximum red a* at 0° C.; PD Waveform (Volts) | 6.2 | 5.6 | 8 |
| Red color a* at 0° C.; PD Waveform | 22 | 22 | 14 |
| Polyurethane dispersive component of the surface energy (mN/m) | 47 | 47 | 39 |
| Polyurethane Total surface energy (mN/m) | 58 | 58 | 43 |
| Carbon Black dispersive component of the surface energy (mN/m) | | | 11 |
| Carbon Black Total surface energy (mN/m) | | | 35 |

Information for the materials of Table 1: [1] Poly(vinyl alcohol-co-ethylene) copolymer; Exceval™ RS-1717, supplied by Kuraray; [2] Polyurethane aqueous dispersion; L3838 aqueous dispersion, supplied by Hauthaway as a 35% dispersion in water; [3] Polyurethane aqueous dispersion; HD2125 aqueous dispersion, supplied by Hauthaway as a 35% dispersion in water; [4] Polyurethane aqueous dispersion (polyester); Witcobond® 386-03, supplied by Chemtura Corp.; [5] Carbon black; Raven® 1060 UP supplied by Colombia; [6] Carbon black; Nerox® 3500, supplied by Orion Engineered Carbons; [7] Carbon black; Nerox® 2500, supplied by Orion Engineered Carbons; [8] Carbon black; TPK1227R, supplied by Cabot Corporation; [9] Carbon black; Raven® 14, supplied by Colombia.

The evaluation results of Table 1 show that improved electro-optic performance was observed in inventive Ex. 1 to Ex. 5 in comparison to Comparative Ex. 6. Driven by PP waveform, the red state at low temperature (0° C.) of the electro-optic device formed by the inventive composition examples exhibit better (more saturated) color than that of the Comparative example, as can be shown by the higher value of the a* value, measured spectrophotometrically. The same was observed for the red states driven by the PD waveform. Not only the color of the inventive displays is more saturated, but also it is achieved with lower voltages, as can be seen from the lower values of the voltages at maximum a*. This means that the inventive displays consume less power than the display using the comparative composition example. This was achieved because the total surface energy of the sealing layer of the inventive examples is approximately 66 mN/m, which is higher than 55 mN/m, as opposed to total surface energy of 53 mN/m of the sealing layer formed by the comparative example. Analogously, the improved performance of the inventive displays is achieved because of the high dispersive surface energy of the sealing layer, which is higher than 40 mN/m, as opposed to 38 mN/m for the sealing layer of the inventive display. The total surface energy of the components of the composition positively affect the surface energy of the sealing layer. Specifically, polyurethanes, which form films with total surface energy higher than 50 mN/m (such as polyurethane dispersions L3838 and HD2125), perform better than polyurethane that form films with lower total surface energy (Witcobond® 386-03).

The effect of the surface energy of the conductive filler also plays a role in the improved performance. Carbon black having total surface energy higher than 40 mN/m, for example, carbon black Raven® 1060 UP, outperform carbon black having total surface energy lower than 40 mN/m, such as Raven® 14. In addition, carbon blacks with dispersive component of the surface energy higher than 15 mN/m show good performance. Without being limited by theory, the improved electro-optic performance (especially at low temperature) of sealing layers having high surface energy may enable them to transfer electrical charges through interlayers at less interface resistance and capacitance. Less resistance and capacitance at the interface of sealing layer/electrophoretic medium leads to significant less electro-optic bias (kickback), especially at low temperatures. The higher surface energy of the sealing layer also may result in less contact resistance and capacitance at the interface of sealing with an adhesive layer that may be adjacent to it. High surface energy of the sealing layer may increase the work of adhesion between the sealing layer and the adhesive layer, leading to the decrease in contact resistance between the layers. Furthermore, less contact resistance at the sealing/adhesive interface results in less voltage drop and less power consumption and improved electro-optic performance across the temperature range. The effect of surface energy of a sealing layer to electro-optic performance in electrophoretic displays is not disclosed in the literature.

Table 2 provides surface energy data for the various Polymer 1 and Polymer 2 species. It also includes evaluation of the barrier properties of various layers and calculated interfacial of the various polymer combinations. The method for the preparation of the corresponding polymer layers that were used for barrier property evaluation is described in C above. The determination of surface energy (according to the method described in D above) was performed by first preparing and conditioning a sealing layer from the corresponding aqueous polymer compositions comprising only one polymer. The interfacial tension for each polymer combination was calculated from surface energy data and the calculation method described in I above.

TABLE 2

| | | | Polymer 1 | | |
|---|---|---|---|---|---|
| | Polymer 1 | Polymer 2 | Polarity (mN/m) | Degree of Hydrolysis % | % Ethylene Content |
| Comparative Ex. 7 | RS1717 | AM8100 | 13.3 | 93 | 8 |
| Comparative Ex. 8 | RS1717 | Dispercoll U 58 | 13.3 | 93 | 8 |
| Comparative Ex. 9 | RS1717 | Dispercoll 2643 U XP | 13.3 | 93 | 8 |
| Comparative Ex. 10 | RS1717 | WS-5000 | 13.3 | 93 | 8 |
| Comparative Ex. 11 | RS1717 | Dispercoll U 56 | 13.3 | 93 | 8 |
| Comparative Ex. 12 | RS1717 | Witcobond 386-03 | 13.3 | 93 | 8 |
| Comparative Ex. 13 | RS1717 | BPI-UD-104 | 13.3 | 93 | 8 |
| Comparative Ex. 14 | RS1717 | Witcobond 737 | 13.3 | 93 | 8 |
| Comparative Ex. 15 | RS2817SB | Witcobond 386-03 | 27.8 | 96.5 | 10 |
| Comparative Ex. 16 | RS1713 | Witcobond 737 | 16.9 | 93 | 8 |
| Comparative Ex. 17 | RS1713 | Witcobond 386-03 | 16.9 | 93 | 8 |
| Comparative Ex. 18 | OKS1009 | Witcobond 737 | 11.5 | >99 | 0 |
| Comparative Ex. 19 | RS1717 | Witcobond A-100 | 13.3 | 93 | 8 |
| Ex. 20 | RS1717 | HD-2503 | 13.3 | 93 | 8 |
| Ex. 21 | RS1717 | HD-2125 | 13.3 | 93 | 8 |
| Ex. 22 | RS1717 | L3838 | 13.3 | 93 | 8 |
| Ex. 23 | RS1717 | PU677 | 13.3 | 93 | 8 |
| Ex. 24 | RS1717 | Takelac WPB341 | 13.3 | 93 | 8 |
| Ex. 25 | RS1717 | L-2897 | 13.3 | 93 | 8 |
| Ex. 26 | RS1717 | Dispercoll 2815U XP | 13.3 | 93 | 8 |
| Ex. 27 | RS2817SB | Dispercoll U 58 | 27.8 | 96.5 | 10 |
| Ex. 28 | RS2817SB | Dispercoll U 56 | 27.8 | 96.5 | 10 |
| Ex. 29 | Z410 | HD-2125 | 17.5 | 98 | 0 |
| Ex. 30 | OKS1109 | HD-2125 | 18.3 | >99 | 0 |
| Ex. 31 | OKS1009 | HD-2125 | 11.5 | >99 | 0 |
| Ex. 32 | RS1113 | HD-2125 | 22.9 | 98.5 | 8 |

| | | | Polymer 2 | | | | |
|---|---|---|---|---|---|---|---|
| | Polymer 1 | Polymer 2 | Dispersive Component of the Surface Energy (mN/m) | Polar Component of Surface Energy (mN/m) | Total Surface Energy (mN/m) | PVA-PUD interfacial tension (mN/m) | PASS/ FAIL |
| Comparative Ex. 7 | RS1717 | AM8100 | 33 | 1 | 34 | 7.2 | FAIL |
| Comparative Ex. 8 | RS1717 | Dispercoll U 58 | 47 | 32.2 | 79 | 4.3 | FAIL |
| Comparative Ex. 9 | RS1717 | Dispercoll 2643 U XP | 33 | 3.4 | 37 | 3.4 | FAIL |
| Comparative Ex. 10 | RS1717 | WS-5000 | 45 | 3.5 | 48 | 3.4 | FAIL |
| Comparative Ex. 11 | RS1717 | Dispercoll U 56 | 45 | 28.6 | 74 | 3.2 | FAIL |
| Comparative Ex. 12 | RS1717 | Witcobond 386-03 | 39 | 4.3 | 43 | 2.5 | FAIL |
| Comparative Ex. 13 | RS1717 | BPI-UD-104 | 38 | 5 | 43 | 2 | FAIL |
| Comparative Ex. 14 | RS1717 | Witcobond 737 | 42 | 5.2 | 47 | 2 | FAIL |
| Comparative Ex. 15 | RS2817SB | Witcobond 386-03 | 39 | 4.3 | 43 | 10.5 | FAIL |

TABLE 2-continued

| | | | | | | | |
|---|---|---|---|---|---|---|---|
| | | | Barrier Property of Sealing Layers. | | | | |
| Comparative Ex. 16 | RS1713 | Witcobond 737 | 42 | 5.2 | 47 | 4.2 | FAIL |
| Comparative Ex. 17 | RS1713 | Witcobond 386-03 | 39 | 4.3 | 43 | 3.4 | FAIL |
| Comparative Ex. 18 | OKS1009 | Witcobond 737 | 42 | 5.2 | 47 | 2.9 | FAIL |
| Comparative Ex. 19 | RS1717 | Witcobond A-100 | 47 | 4.3 | 52 | 3 | FAIL |
| Ex. 20 | RS1717 | HD-2503 | 48 | 11.5 | 59 | 0.6 | PASS |
| Ex. 21 | RS1717 | HD-2125 | 48 | 14.2 | 62 | 0.6 | PASS |
| Ex. 22 | RS1717 | L3838 | 47 | 11.4 | 58 | 0.5 | PASS |
| Ex. 23 | RS1717 | PU677 | 44 | 16.8 | 61 | 0.4 | PASS |
| Ex. 24 | RS1717 | Takelac WPB341 | 45 | 14.2 | 59 | 0.3 | PASS |
| Ex. 25 | RS1717 | L-2897 | 48 | 13.3 | 61 | 0.2 | PASS |
| Ex. 26 | RS1717 | Dispercoll 2815U XP | 37 | 14.8 | 52 | 0 | PASS |
| Ex. 27 | RS2817SB | Dispercoll U 58 | 47 | 32.2 | 79 | 0.1 | PASS |
| Ex. 28 | RS2817SB | Dispercoll U 56 | 45 | 28.6 | 74 | 0 | PASS |
| Ex. 29 | Z410 | HD-2125 | 48 | 14.2 | 62 | 0.4 | PASS |
| Ex. 30 | OKS1109 | HD-2125 | 48 | 14.2 | 62 | 0.8 | PASS |
| Ex. 31 | OKS1009 | HD-2125 | 48 | 14.2 | 62 | 0.4 | PASS |
| Ex. 32 | RS1113 | HD-2125 | 48 | 14.2 | 62 | 1.8 | PASS |

TABLE 3

| | Polymer | Chemical Name | Commercial Name | Supplier |
|---|---|---|---|---|
| | | Commercial materials used in the Examples 7-32 of Table 2. | | |
| RS1717 | Polymer 1 | Poly(vinyl alcohol-co-ethylene) copolymer | Exceval ™ RS-1717 | Kuraray |
| RS28175B | Polymer 1 | Poly(vinyl alcohol-co-ethylene) copolymer | Exceval ™ RS-2817 SB | Kuraray |
| RS1713 | Polymer 1 | Poly(vinyl alcohol-co-ethylene) copolymer | Exceval ™ RS-1713 | Kuraray |
| OKS1009 | Polymer 1 | Poly(vinyl alcohol) homopolymer | OKS-1009 | Soarus |
| OKS1110 | Polymer 1 | Poly(vinyl alcohol) homopolymer | OKS-1109 | Soarus |
| Z410 | Polymer 1 | Poly(vinyl alcohol) homopolymer | GOHSENX ™ Z-410 | Soarus |
| RS1113 | Polymer 1 | Poly(vinyl alcohol-co-ethylene) copolymer | Exceval ™ RS-1113 | Kuraray |
| AM8100 | Polymer 2 | Polyurethane aqueous dispersion (polyamide) | Aptalon ™ M8100 | Lubrizol |
| Dispercoll U58 | Polymer 2 | Polyurethane aqueous dispersion | Dispercoll ® U58 | Covestro |
| Dispercoll 2643 U XP | Polymer 2 | Polyurethane aqueous dispersion | Dispercoll ® U XP 2643 | Covestro |
| WS-5000 | Polymer 2 | Polyurethane aqueous dispersion | Takelac ™ WS-5000 | Mitsui Chemicals |
| Witcobond 386-03 | Polymer 2 | Polyurethane aqueous dispersion (polyester) | Witcobond ® 386-03 | Chemtura Corp. |
| BPI-UD-104 | Polymer 2 | Polyurethane aqueous dispersion (polyester) | Bondathane ™ UD 104 (BPI-ID 104) | Bond Polymers International |
| Witcobond 737 | Polymer 2 | Polyurethane aqueous dispersion (polyester) | Witcobond ® 737 | Chemtura Corp. |
| Witcobond A-100 | Polymer 2 | Polyurethane aqueous dispersion | Witcobond ® A-100 | Chemtura Corp. |
| HD-2503 | Polymer 2 | Polyurethane aqueous dispersion | Hauthane HD-2503 | Hauthane & Sons Corp. |
| HD-2125 | Polymer 2 | Polyurethane aqueous dispersion (polyester, polycarbonate) | Hauthane HD-2125 | Hauthane & Sons Corp. |
| L3838 | Polymer 2 | Polyurethane aqueous dispersion (polyester) | Hauthane L3838 | Hauthane & Sons Corp. |
| PU677 | Polymer 2 | Polyurethane aqueous dispersion | Relca ® PU-677 | Stahl |
| Takelac WPB341 | Polymer 2 | Polyurethane aqueous dispersion (polyester) | Takelac ™ WBP-341 | Mitsui Chemicals |

TABLE 3-continued

| | | | | |
|---|---|---|---|---|
| | | Commercial materials used in the Examples 7-32 of Table 2. | | |
| | Polymer | Chemical Name | Commercial Name | Supplier |
| L-2897 | Polymer 2 | Polyurethane aqueous dispersion (polyester) | Hauthane L2897 | Hauthane & Sons Corp. |
| Dispercoll 2815U XP | Polymer 2 | Polyurethane aqueous dispersion (polyester) | Dispercoll ® U 2815 XP | Covestro |
| Dispercoll U 56 | Polymer 2 | Polyurethane aqueous dispersion (polyester) | Dispercoll ® U56 | Covestro |

The data of Table 2 show that sealing layers formed with aqueous polymer compositions comprising combinations of Polymer 1 and Polymer 2 with low interfacial tension exhibit good barrier properties for non-polar fluids. The sealing layers comprise (a) poly(vinyl alcohol) polymer or poly(vinyl alcohol-co-ethylene) copolymer having a degree of hydrolysis of from 90 to 99.5% and ethylene content of less than 10%, and (b) a polyurethane.

The data of Table 2 also show that the sealing layers that comprise (a) poly(vinyl alcohol) polymer or poly(vinyl alcohol-co-ethylene) copolymer having a degree of hydrolysis of from 90 to 99.5% and ethylene content of less than 10%, and (b) a polyurethane. Sealing layers comprising polyurethanes having polar component of the surface energy between 10 and 20 mN/m show have good barrier properties for a non-polar fluid.

Figure 12:
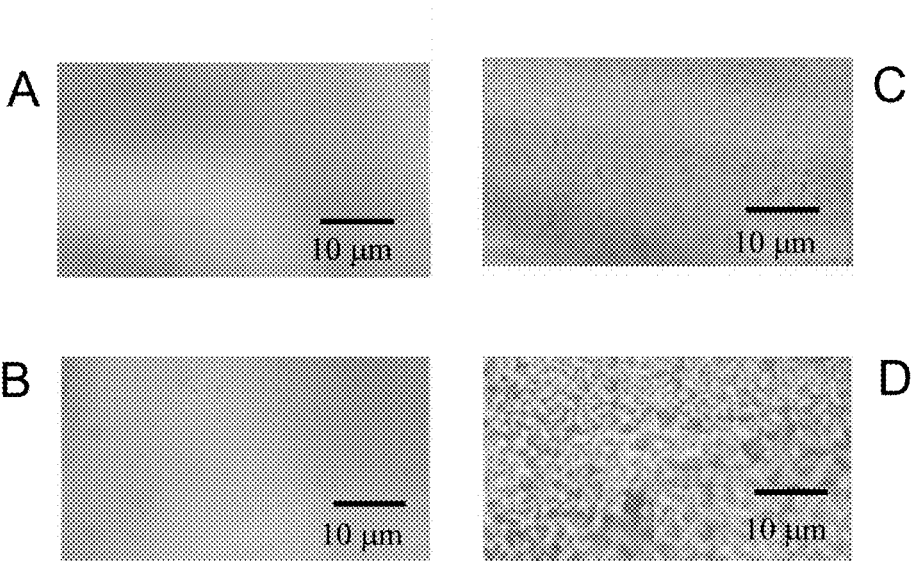
FIG. 12 shows microscopic images of polymer films comprising a combination of poly(vinyl alcohol-co-ethylene) copolymer and polyurethane having different interfacial tensions.

Microscopic evaluation of polymer films prepared by four aqueous polymer compositions prepared by the method described in B above showed that there is a correlation between uniformity of the film and the interfacial tension between the two polymers. The weight ratio of Polymer 1:Polymer 2 in the prepared films was 1:1. Table 4 and the microscopic images of FIG. 12 show that lower interfacial tension provides more uniform polymer films. The improved compatibility achieved by the combination of the polymers having smaller interfacial tension, may explain the improved barrier properties of the corresponding layer.

TABLE 4

| | | | |
|---|---|---|---|
| Polymer films comprising a combination of poly(vinyl alcohol-co-ethylene) copolymer and polyurethane having different interfacial tensions. | | | |
| Polymer 1 | Polymer 2 | PVA-PUD interfacial tension (mN/m) | Microscopic Image FIG. 12 |
| Poly(vinyl alcohol-co-ethylene) copolymer; Exceval ™ RS-1717, supplied by Kuraray | Polyurethane aqueous dispersion Witcobond ® 373-05, supplied by Chemtura | 0.03 | A |
| Poly(vinyl alcohol-co-ethylene) copolymer; Exceval ™ RS-1717, supplied by Kuraray | Polyurethane aqueous dispersion (polyester) Dispercoll ® 2815 XP, supplied by Covestro | 1.95 | B |
| Poly(vinyl alcohol-co-ethylene) copolymer; Exceval ™ RS-1717, supplied by Kuraray | Polyurethane aqueous dispersion (polyester) Dispercoll ® 2643 U XP XP, supplied by Covestro | 3.42 | C |
| Poly(vinyl alcohol-co-ethylene) copolymer; Exceval ™ RS-1717, supplied by Kuraray | Polyurethane aqueous dispersion Witcobond ® 361-72, supplied by Chemtura | 4.42 | D |

Additional sealing layers were prepared from aqueous polymer compositions comprising combinations of Polymer 1 and Polymer 2 at various contents. These aqueous polymer compositions comprised, in addition to the combination of polymers, carbon black filler, a crosslinker, a wetting agent, a rheology modifier, and an aqueous carrier. The aqueous polymer compositions, which show the aqueous carrier content, are provided in Table 5. Table 6 correspond to the same compositions as Table 5, but the compositions of Table 6 are adjusted to show the weight % for each ingredient by weight of the aqueous polymer composition excluding solvents. The aqueous polymer compositions were prepared using the method described in A1 and A2 above. The corresponding sealing layers were prepared using the method described in B above.

TABLE 5

Aqueous Polymer Compositions Comprising Various Polymer Contents.
Contents are weight % of ingredient by weight of the total composition
(including the water carrier).

| Ingredient | Ex. 33 | Ex. 34 | Ex. 35 | Ex. 36 | Ex. 37 | Ex. 38 |
|---|---|---|---|---|---|---|
| Poly(vinyl alcohol-co-ethylene) copolymer; [1] | 10 | 9 | 8.1 | 8 | 7.3 | 8.1 |
| Polyurethane aqueous dispersion; [2] | 3.3 | 5.3 | | | | |
| Polyurethane aqueous dispersion; [3] | | | | | 4.7 | 4.3 |
| Polyurethane aqueous dispersion; [4] | | | 3 | 3.4 | | |
| Polycarbodiimide (Multifunctional polycarbodiimide-Water Solution); [5] | | | 0.94 | 0.95 | 0.98 | |
| Solvent based multifunctional polycarbodiimide crosslinker; [6] | 0.91 | 0.95 | | | | 0.9 |
| Carbon black (powder) | 3.3 | 3.4 | 6.4 | 6.1 | 6.1 | 4 |
| Siloxane Polyalkyleneoxide Copolymer; [7] | 0.18 | 0.19 | 0.19 | 0.19 | 0.2 | 0.18 |
| Hydrophobically modified alkali swellable acrylic emulsion; [8] | 0.31 | 0.32 | 0.32 | 0.32 | 0.33 | 0.31 |
| Ammonium Hydroxide to adjust pH to 6.5-8.5 | | | | | | |
| Water | Q.S. | Q.S. | Q.S. | Q.S. | Q.S. | Q.S. |

| Ingredient | Ex. 30 | Ex. 40 | Ex. 41 | Ex. 42 | Ex. 43 | Ex. 44 |
|---|---|---|---|---|---|---|
| Poly(vinyl alcohol-co-ethylene) copolymer; [1] | 5.4 | 10 | 8 | 8.5 | 10.2 | 11.7 |
| Polyurethane aqueous dispersion; [2] | | | | | | |
| Polyurethane aqueous dispersion; [3] | 4.3 | 4.7 | | | | |
| Polyurethane aqueous dispersion; [4] | | | 2.2 | 2.7 | 1.9 | 1.6 |
| Polycarbodiimide (Multifunctional polycarbodiimide-Water Solution); [5] | 0.85 | 0.94 | 0.93 | 0.91 | 0.93 | 1.03 |
| Solvent based multifunctional polycarbodiimide crosslinker; [6] | | | | | | |
| Carbon black (powder) | 6 | 5.3 | 6.3 | 6.4 | 5.4 | 3.1 |
| Siloxane Polyalkyleneoxide Copolymer; [7] | 0.17 | 0.19 | 0.19 | 0.18 | 0.19 | 0.21 |
| Hydrophobically modified alkali swellable acrylic emulsion; [8] | 0.29 | 0.32 | 0.32 | 0.31 | 0.31 | 0.35 |
| Ammonium Hydroxide to adjust pH to 6.5-8.5 | | | | | | |
| Water | Q.S. | Q.S. | Q.S. | Q.S. | Q.S. | Q.S. |

TABLE 6

Aqueous polymer compositions corresponding to those of Table 5. Contents
are weight % of ingredient by weight of the composition excluding the water carrier.

| Ingredient | Ex. 33 | Ex. 34 | Ex. 35 | Ex. 36 | Ex. 37 | Ex. 38 |
|---|---|---|---|---|---|---|
| Poly(vinyl alcohol-co-ethylene) copolymer; [1] | 55.7 | 46.7 | 42.7 | 42.1 | 37.1 | 45.6 |
| Polyurethane aqueous dispersion; [2] | 18.2 | 27.8 | | | | |
| Polyurethane aqueous dispersion; [3] | | | | | 24.1 | 24.3 |
| Polyurethane aqueous dispersion; [4] | | | 15.9 | 18.1 | | |
| Polycarbodiimide Multifunctional polycarbodiimide; Water Solution); [5] | | | 5 | 5 | 5 | |
| Solvent based multifunctional polycarbodiimide crosslinker; [6] | 5.1 | 5 | | | | 5.1 |
| Carbon black (powder) | 18.2 | 17.9 | 33.8 | 32.1 | 31.1 | 22.3 |
| Siloxane Polyalkyleneoxide Copolymer; [7] | 1 | 1 | 1 | 1 | 1 | 1 |
| Hydrophobically modified alkali swellable acrylic emulsion; [8] | 1.7 | 1.7 | 1.7 | 1.7 | 1.7 | 1.7 |
| Barrier Property | PASS | PASS | PASS | PASS | PASS | PASS |
| Ratio of Poly(vinyl alcohol-co-ethylene) copolymer: Polyurethane | 3.1 | 1.7 | 2.7 | 2.3 | 1.5 | 1.9 |

| Ingredient | Ex. 30 | Ex. 40 | Ex. 41 | Ex. 42 | Ex. 43 | Ex. 44 |
|---|---|---|---|---|---|---|
| Poly(vinyl alcohol-co-ethylene) copolymer; [1] | 32.1 | 46.6 | 44.5 | 44.9 | 54.1 | 65 |
| Polyurethane aqueous dispersion; [2] | | | | | | |
| Polyurethane aqueous dispersion; [3] | 25.1 | 22 | | | | |
| Polyurethane aqueous dispersion; [4] | | | 12.4 | 14.3 | 9.8 | 9.1 |

TABLE 6-continued

Aqueous polymer compositions corresponding to those of Table 5. Contents
are weight % of ingredient by weight of the composition excluding the water carrier.

| | | | | | | |
|---|---|---|---|---|---|---|
| Polycarbodiimide Multifunctional polycarbodiimide; Water Solution); [5] Solvent based multifunctional polycarbodiimide crosslinker; [6] | 5 | 4.4 | 5.2 | 4.8 | 4.9 | 5.7 |
| Carbon black (powder) | 35.1 | 24.6 | 35.2 | 33.4 | 28.5 | 17.1 |
| Siloxane Polyalkyleneoxide Copolymer; [7] | 1 | 0.9 | 1 | 1 | 1 | 1.1 |
| Hydrophobically modified alkali swellable acrylic emulsion; [8] | 1.7 | 1.5 | 1.8 | 1.6 | 1.7 | 1.9 |
| Barrier Property | PASS | PASS | PASS | PASS | PASS | PASS |
| Ratio of Poly(vinyl alcohol-co-ethylene) copolymer: Polyurethane | 1.3 | 2.1 | 3.6 | 3.1 | 5.5 | 7.1 |

Information on the ingredients of Tables 5 and 6: [1] Exceval™ RS-1717, supplied by Kuraray; [2] Dispercoll® U XP2815, supplied by Covestro; 35% dispersion in water; [3] Hauthane HD-2125, supplied by Hauthaway; 35% dispersion in water; [4] Hauthane L3838, supplied by Hauthaway; 35% dispersion in water; [5] CA.RBODILITE® V-02-L2, supplied by Nisshimbo Chemical; 40% solution in water; [6] Picassian® XL-701, supplied by Stahl; [7] Silwet® L-7607 copolymer, supplied by Momentive; [8] Solthix™ A-100, supplied by Lubrizol.

A series of carbon black products were evaluated for their dispersibility in a polymer composition. Carbon blacks that show good dispersibility enable aqueous polymer compositions having good dispersion quality. Dispersion quality of an aqueous polymer composition is an important parameter that affects the properties of the resulting sealing layer. Inferior dispersion quality of the aqueous polymer composition results in a sealing layer that has very low volume conductivity, which leads in poor electro-optic performance and poor electric efficiency of the device. Table 7 provides the results of the investigation. The dispersion quality of the carbon black dispersion was determined by the method described in H above.

TABLE 7

Dispersibility Evaluation of Carbon Black Samples having various specific
surface areas.

| Carbon Black | Specific Surface Area by Nitrogen Surface Area Method (ASTM D6556) (m2/g) | Volatile Content % by DIN 53552 | Dispersion Quality Determination |
|---|---|---|---|
| Carbon Black; Mogul L ®, supplied by Cabot | 138 | 4.5 | FAIL |
| Carbon Black; Nerox ® 505, supplied by Orion Engineered Carbon | 114 | 3.0 | FAIL |
| Carbon Black; Raven ® 1035, supplied by Birla Carbon | 91 | 2.4 | FAIL |
| Carbon Black; Raven ® 1040, supplied by Birla Carbon | 90 | 2.6 | FAIL |
| Carbon Black; Raven ® 1060 UP, supplied by Birla Carbon | 66 | 1.6 | PASS |
| Carbon Black; Special Black 350, supplied by Orion Engineered Carbon | 65 | 2.2 | PASS |
| Carbon Black; Nerox ® 3500, supplied by Orion Engineered Carbon | 64 | 1.6 | PASS |
| Carbon Black; Nerox ® 2500, supplied by Orion Engineered Carbon | 51 | 1.8 | PASS |
| Carbon Black; Raven ® 14, supplied by Birla Carbon | 44 | 1.7 | PASS |
| Carbon Black; Special Black 250, supplied by Orion Engineered Carbon | 40 | 2.0 | PASS |
| Carbon Black; Nerox ® 1000, supplied by Orion Engineered Carbon | 36 | 2.0 | PASS |
| Carbon Black; Special Black 100, supplied by Orion Engineered Carbon | 30 | 2.2 | PASS |
| Carbon Black; Color Black FW 200, supplied by Orion Engineered Carbon | 550 | 20.0 | FAIL |
| Carbon Black; Special Black 6, supplied by Orion Engineered Carbon | 300 | 18.0 | FAIL |
| Carbon Black; Special Black 5, supplied by Orion Engineered Carbon | 240 | 15.0 | FAIL |
| Carbon Black; Special Black 4, supplied by Orion Engineered Carbon | 180 | 14.0 | PASS |
| Carbon Black; Nipex 150, supplied by Orion Engineered Carbon | 175 | 10.0 | PASS |

The results of the evaluation of dispersibility of carbon black of Table 7 show that carbon black grades having specific surface area less than 85 m²/g have good dispersibility in aqueous polymer dispersion. Carbon blacks that have specific surface area between 85 and 200 m²/g and volatile content higher than 5% also have good dispersibility in aqueous polymer dispersion. Carbon blacks that have specific surface area higher than 85 and volatile content lower than 5% do not have good dispersibility in aqueous polymer dispersion. Finally, carbon blacks that have specific surface area higher than 200 m²/g do not show good dispersibility in aqueous polymer dispersion. The volatile content of carbon black is measured as a weight percent of the materials that are removed from the product after heating at 950° C. The method titled "Testing of Carbon Black; Determination of the Amount of Components of Carbon Black that are Volatile on Heating" is described in DIN 53552. The volatile content does not include moisture or solvent content that may be present in the particles.

A series of carbon black products, for which average particles size have been reported by the suppliers using Transmission Electron Microscopy (TEM), were also evaluated for their dispersibility in a polymer composition. Table 8 provides the results of the investigation. The dispersion quality of the carbon black dispersion was determined by the method described in H above.

TABLE 8

Dispersibility Evaluation of Carbon Black Samples having various average particle sizes.

| Carbon Black Grade | Average Particle Size (nm) ASTM D3849 | Dispersion Quality |
|---|---|---|
| Carbon Black; Color Black FW 200, supplied by Orion Engineered Carbon | 13 | FAIL |
| Carbon Black; Special Black 6, supplied by Orion Engineered Carbon | 17 | FAIL |
| Carbon Black; Special Black 5, supplied by Orion Engineered Carbon | 20 | FAIL |
| Carbon Black; Nipex 150, supplied by Orion Engineered Carbon | 25 | PASS |
| Carbon Black; Special Black 4, supplied by Orion Engineered Carbon | 25 | PASS |
| Carbon Black; Nerox ® 3500, supplied by Orion Engineered Carbon | 31 | PASS |
| Carbon Black; Special Black 350, supplied by Orion Engineered Carbon | 31 | PASS |

TABLE 8-continued

Dispersibility Evaluation of Carbon Black Samples having various average particle sizes.

| Carbon Black Grade | Average Particle Size (nm) ASTM D3849 | Dispersion Quality |
|---|---|---|
| Carbon Black; Special Black 250, supplied by Orion Engineered Carbon | 47 | PASS |
| Carbon Black; Special Black 100, supplied by Orion Engineered Carbon | 50 | PASS |
| Carbon Black; Nerox ® 2500, supplied by Orion Engineered Carbon | 47 | PASS |
| Carbon Black; Nerox ® 1000, supplied by Orion Engineered Carbon | 51 | PASS |

The results of the evaluation of dispersibility of carbon black of Table 8 show that carbon black products that have average particles size larger than 20 nm have good dispersibility in aqueous polymer dispersion. The carbon black supplier (Orion Engineered Carbon) determined the average particle size of the products using ASTM D3849 (Standard Method for Carbon Black-Morphological Characterization of Carbon Black Using Electron Microscopy).

A series of sealing layers, which were formed by aqueous polymer compositions comprising various carbon black commercial products, were evaluated for sealing layer volume resistivity using the method described above (I. Method for evaluation of volume resistivity of the sealing layer). Electro-optic displays were prepared using the method described above (E. Preparation for the Electro-Optic Device). The prepared electro-optic displays were evaluated for resolution by the method described above (J. Method of evaluation of the resolution of the display image. Tables 9 and 10 provide the aqueous polymer composition that were prepared for this investigation. The aqueous polymer compositions, which show the contents of all of the ingredients of the aqueous polymer compositions, including the content of the aqueous carrier content, are provided in Table 9. Table 10 provides sealing layer compositions (excluding potential water contents), the sealing layers prepared by the aqueous polymer compositions of Table 9. The compositions of Table 9 provide the weight % for each ingredient by weight of the aqueous polymer composition including the water. The various aqueous polymer compositions were prepared by the method described in A1 and A2 above. The corresponding sealing layers were prepared by the method described in B above.

TABLE 9

Aqueous polymer compositions for the evaluation of volume resistivity and electro-optic performance (image resolution) of sealing layers that comprise various carbon black fillers. The contents of the ingredient are reported in weight % of the ingredient by weight of the composition.

| Ingredient | Ex. 45 | Ex. 46 | Ex. 47 | Ex. 48 | Comparative Ex. 49 | Comparative Ex. 50 |
|---|---|---|---|---|---|---|
| Carbon Black; Special Black 250, supplied by Orion Engineered Carbon | 6.2 | | | | | |
| Carbon Black; Nerox ® 2500, supplied by Orion Engineered Carbon | | 6.0 | | | | |
| Carbon Black; Raven ® 1060 UP, supplied by Birla Carbon | | | 5.8 | | | |
| Carbon Black; Special Black 100, | | | | 4.3 | | |

TABLE 9-continued

Aqueous polymer compositions for the evaluation of volume resistivity and
electro-optic performance (image resolution)
of sealing layers that comprise various carbon black
fillers. The contents of the ingredient are reported
in weight % of the ingredient by weight of the composition.

| Ingredient | Ex. 45 | Ex. 46 | Ex. 47 | Ex. 48 | Comparative Ex. 49 | Comparative Ex. 50 |
|---|---|---|---|---|---|---|
| supplied by Orion Engineered Carbon | | | | | | |
| Carbon Black; Nerox ® 1000, supplied by Orion Engineered Carbon | | | | | 4.9 | |
| Carbon Black; Raven ® 14, supplied by Birla Carbon | | | | | | 4.2 |
| Polyurethane aqueous dispersion; Hauthane HD-2125, supplied by Hauthaway as a 35% dispersion in water | 3.1 | 3.2 | 3.4 | 4.1 | 3.8 | 3.4 |
| Poly(vinyl alcohol-co-ethylene) copolymer; Exceval ™ RS-1717, supplied by Kuraray | 7.1 | 7.5 | 8 | 9.7 | 8.8 | 7.9 |
| Polycarbodiimide (Multifunctional polycarbodiimide-Water Solution); CARBODILITE ® V-02-L2, supplied by Nisshinbo Chemical as a 40% solution in water | 0.89 | 0.91 | 0.94 | 0.98 | 0.95 | 0.84 |
| Siloxane Polyalkyleneoxide Copolymer; Silwet ® L-7607 copolymer, supplied by Momentive | 0.18 | 0.18 | 0.19 | 0.2 | 0.19 | 0.17 |
| Hydrophobically modified alkali swellable acrylic emulsion; Solthix ™ A-100, supplied by Lubrizol | 0.21 | 0.22 | 0.22 | 0.24 | 0.23 | 0.2 |
| Ammonium Hydroxide to adjust pH to 6.5 to 8.5 | | | | | | |
| Water | Q.S. | Q.S. | Q.S. | Q.S. | Q.S. | Q.S. |

TABLE 10

Aqueous polymer compositions for the evaluation of volume resistivity and
electro-optic performance (image resolution) of sealing layers that comprise various carbon black
fillers. The contents of the ingredients are reported in weight % of the ingredient by weight of the
composition excluding the water carrier. These compositions approach the contents of the dried
sealing layers.

| Ingredients | Ex. 45 | Ex. 46 | Ex. 47 | Ex. 48 | Comparative Ex. 49 | Comparative Ex. 50 |
|---|---|---|---|---|---|---|
| Carbon Black; Special Black 250, supplied by Orion Engineered Carbon | 35.0 | | | | | |
| Carbon Black; Nerox ® 2500, supplied by Orion Engineered Carbon | | 33.0 | | | | |
| Carbon Black; Raven ® 1060 UP, supplied by Birla Carbon | | | 31.0 | | | |
| Carbon Black; Special Black 100, supplied by Orion Engineered Carbon | | | | 22.0 | | |
| Carbon Black; Nerox ® 1000, supplied by Orion Engineered Carbon | | | | | 26.0 | |
| Carbon Black; Raven ® 14, supplied by Birla Carbon | | | | | | 25.0 |
| Polyurethane aqueous dispersion; Hauthane HD-2125, supplied by Hauthaway as a 35% dispersion in water | 17.2 | 17.8 | 18.4 | 21.1 | 19.9 | 20.2 |

TABLE 10-continued

Aqueous polymer compositions for the evaluation of volume resistivity and
electro-optic performance (image resolution) of sealing layers that comprise various carbon black
fillers. The contents of the ingredients are reported in weight % of the ingredient by weight of the
composition excluding the water carrier. These compositions approach the contents of the dried
sealing layers.

| Ingredients | Ex. 45 | Ex. 46 | Ex. 47 | Ex. 48 | Comparative Ex. 49 | Comparative Ex. 50 |
|---|---|---|---|---|---|---|
| Poly(vinyl alcohol-co-ethylene) copolymer; Exceval ™ RS-1717, supplied by Kuraray | 40.1 | 41.5 | 42.9 | 49.2 | 46.4 | 47.1 |
| Polycarbodiimide (Multifunctional polycarbodiimide-Water Solution); CARBODILITE ® V-02-L2, supplied by Nisshinbo Chemical as a 40% solution in water | 5.0 | 5.0 | 5.0 | 5.0 | 5.0 | 5.0 |
| Siloxane Polyalkyleneoxide Copolymer; Silwet ® L-7607 copolymer, supplied by Momentive | 1.0 | 1.0 | 1.0 | 1.0 | 1.0 | 1.0 |
| Hydrophobically modified alkali swellable acrylic emulsion; Solthix ™ A-100, supplied by Lubrizol | 1.2 | 1.2 | 1.2 | 1.2 | 1.2 | 1.2 |
| Oil Absdorption Number of the carbon Black (mL/100 g) | 46 | 54 | 50 | 94 | 101 | 111 |
| Sealing Layer Volume Resistivity (Ohm · cm) | $1.5 \times 10^8$ | $2.5 \times 10^9$ | $6.9 \times 10^9$ | $3.1 \times 10^9$ | $3.1 \times 10^7$ | $1.2 \times 10^7$ |
| Resolution Test | 61% | 34% | 59% | 40% | 14% | 10% |

The data of Table 10 show that optimal volume resistivity of the sealing layer and device resolution was achieved by carbon black having oil adsorption values less than 100 mL/100 g.

Furthermore, it was observed during the study, that aqueous polymer compositions comprising more than 70 weight % of poly(vinyl alcohol) homopolymer or poly(vinyl alcohol-co-ethylene) copolymer by weight of the aqueous polymer composition excluding solvents form sealing layers that absorb significant amount of moisture from the environment. This high moisture absorption negatively affects the electro-optic performance of the display.

The invention claimed is:

1. An electrophoretic display comprising:

a first light-transmissive electrode layer;

an electro-optic material layer comprising a sealing layer and a plurality of microcells, each of the plurality of microcells including a bottom, walls, and an opening, and containing an electrophoretic medium, said electrophoretic medium comprising at least one type of charged pigment particles dispersed in a non-polar fluid, the sealing layer spanning the openings of the plurality of microcells;

a second electrode layer;

the electro-optic material layer being disposed between the first light-transmissive electrode layer and the second electrode layer, wherein the sealing layer comprises:

(i) from 30 to 70 weight % of a water soluble poly(vinyl alcohol) homopolymer or poly(vinyl alcohol-co-ethylene) copolymer by weight of the sealing layer excluding solvents, the poly(vinyl alcohol) having a degree of hydrolysis of from 90 to 99.9%, and the poly(vinyl alcohol-co-ethylene) copolymer having a degree of hydrolysis of from 90 to 99.9%;

(ii) from 7 to 29 weight % of a polyurethane by weight of the sealing layer excluding solvents, the polyurethane having a total surface energy, said total surface energy being higher than 50 mN/m, said total surface energy of the polyurethane being determined using the Contact Angle Method by (a) forming a polyurethane film by coating an aqueous polyurethane composition on a substrate at a dry thickness of 30 mm, heating at 100° C. for 15 minutes, and conditioning the polyurethane film at 25° C. and 55% relative humidity for 24 hours, (b) measuring the contact angles of a water droplet and a diiodomethane droplet on the formed polyurethane film, and (c) calculating the total surface energy using the OWRK model;

(iii) from 1 to 45 weight % of a conductive filler by weight of the sealing layer excluding solvents, the conductive filler being selected from the group consisting of carbon black, graphene, graphite, and carbon nanotubes, the conductive filler having a total surface energy, said total surface energy of the conductive filler being higher than 40 mN/m, said total surface energy being determined by the Washburn method using hexane as test liquid;

the sealing layer having a total surface energy, the total surface energy of the sealing layer being higher than 55 mN/m, the total surface energy of the sealing layer being determined using the Contact Angle Method.

2. The electrophoretic display of claim 1, wherein the electrophoretic medium comprises four types of charged pigment particles, wherein the color of the four or more pigment particles are selected from the group consisting of white, magenta, yellow, cyan, blue, red, green, and black.

3. The electrophoretic display of claim 1, wherein the sealing layer has a dispersive component of the surface energy, said dispersive component of the surface energy being higher than 40 mN/m, said dispersive component of the surface energy of the sealing layer being determined using the Contact Angle Method.

4. The electrophoretic display of claim 1, wherein the polyurethane of the sealing layer has a dispersive component of the surface energy, said dispersive component of the surface energy of the polyurethane being higher than 40 mN/m, the dispersive component of the surface energy of the polyurethane being determined using the Contact Angle Method.

5. The electrophoretic display of claim 1, wherein the polyurethane of the sealing layer has a polar component of the surface energy, the polar component of the surface energy of the polyurethane being between 10 mN/m and 20 mN/m, the polar component of the surface energy of the polyurethane being determined using the Contact Angle Method.

6. The electrophoretic display of claim 1, wherein the polyurethane of the sealing layer is crosslinked by a cross-linker, the crosslinker being a polyisocyanate, a multifunctional polycarbodiimide, a multifunctional aziridine, a silane coupling agent, a boron/titanium/zirconium-based crosslinker, or a melamine formaldehyde.

7. The electrophoretic display of claim 1, wherein the polyurethane has number average molecular weight from 1,000 to 2,000,000 Daltons.

8. The electrophoretic display of claim 1, wherein the poly(vinyl alcohol) homopolymer or poly(vinyl alcohol-co-ethylene) copolymer of the sealing layer has number average molecular weight from 1,000 to 1,000,000 Daltons.

9. The electrophoretic display of claim 1, wherein the poly(vinyl alcohol) homopolymer or poly(vinyl alcohol-co-ethylene) copolymer of the sealing layer has a degree of hydrolysis of from 92% to 99%.

10. The electrophoretic display of claim 1, wherein the poly(vinyl alcohol-co-ethylene) copolymer of the sealing layer has ethylene content of less than 10%.

11. The electrophoretic display of claim 1, wherein the sealing layer further comprises a wetting agent, the wetting agent being an organosilicone surface tension reducing agent.

12. The electrophoretic display of claim 1, wherein the conductive filler is carbon black.

13. The electrophoretic display of claim 12, wherein the carbon black has oil absorption number less than 100 mL per 100 mg of carbon black measured by the oil absorption number method according to ASTM 2414.

14. The electrophoretic display of claim 12, wherein the carbon black has average particle size larger than 20 nm measured by electron microscopy method according to ASTM D3849.

15. The electrophoretic display of claim 12, wherein the carbon black has specific surface area less than 90 m²/g measured by the nitrogen adsorption method according to ASTM D6556.

16. The electrophoretic display of claim 12, wherein the carbon black has specific surface area less than 200 m²/g, measured by the nitrogen adsorption method according to ASTM D6556.

17. The electrophoretic display of claim 12, wherein the carbon black has volatile content higher than 5% measured by the method according to DIN 53552.

18. The electrophoretic display of claim 12, wherein the carbon black has a dispersive component of the surface energy, said dispersive component of the surface energy of the conductive filler being higher than 15 mN/m, said dispersive component of the surface energy being determined by the Washburn method using hexane as test liquid.

* * * * *